US008675870B2

(12) United States Patent
Ohira et al.

(10) Patent No.: US 8,675,870 B2
(45) Date of Patent: Mar. 18, 2014

(54) ENCRYPTION APPARATUS

(75) Inventors: Masaki Ohira, Yokohama (JP); Norihiro Sakamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1681 days.

(21) Appl. No.: 11/896,476

(22) Filed: Aug. 31, 2007

(65) Prior Publication Data
US 2008/0155255 A1   Jun. 26, 2008

(30) Foreign Application Priority Data
Dec. 21, 2006   (JP) .................................. 2006-344885

(51) Int. Cl.
*H04K 1/00* (2006.01)
*H04L 29/06* (2006.01)

(52) U.S. Cl.
USPC ............. 380/37; 380/256; 380/257; 713/160

(58) Field of Classification Search
None
See application file for complete search history.

(56) References Cited

U.S. PATENT DOCUMENTS

| 5,933,501 | A  | * | 8/1999  | Leppek ........................ 380/259 |
| 6,460,097 | B1 | * | 10/2002 | Harumoto et al. ............. 710/60   |
| 7,593,399 | B2 | * | 9/2009  | Nishihara .................... 370/389  |
| 7,668,314 | B2 | * | 2/2010  | Kuwabara et al. ............ 380/261   |
| 2004/0151182 | A1 | * | 8/2004 | Kokubo et al. ............. 370/395.1 |
| 2005/0122925 | A1 | * | 6/2005 | Chitre et al. ................ 370/310.1 |
| 2005/0240399 | A1 | * | 10/2005 | Makinen ...................... 704/223 |
| 2007/0126612 | A1 | * | 6/2007 | Miller .............................. 341/67 |
| 2009/0220611 | A1 | * | 9/2009 | Dargelas et al. ............. 424/495 |

FOREIGN PATENT DOCUMENTS

| JP | 2000-013369 | 1/2000 |
| JP | 2000-156697 | 6/2000 |
| JP | 2000-156698 | 6/2000 |

* cited by examiner

*Primary Examiner* — Cordelia Zecher
*Assistant Examiner* — Trang Doan
(74) *Attorney, Agent, or Firm* — McDermott Will & Emery LLP

(57) ABSTRACT

There is provided an encryption apparatus including an idle data inserting unit that takes input of a frame including a fixed-length header and a variable-length payload and an encrypting unit that receives an output of the idle data inserting unit. If the length of a block to be processed, included in the payload, is less than a predetermined value, the idle data inserting unit appends idle data following the block and transmits the frame including the block padded with the idle data to the encrypting unit.

8 Claims, 35 Drawing Sheets

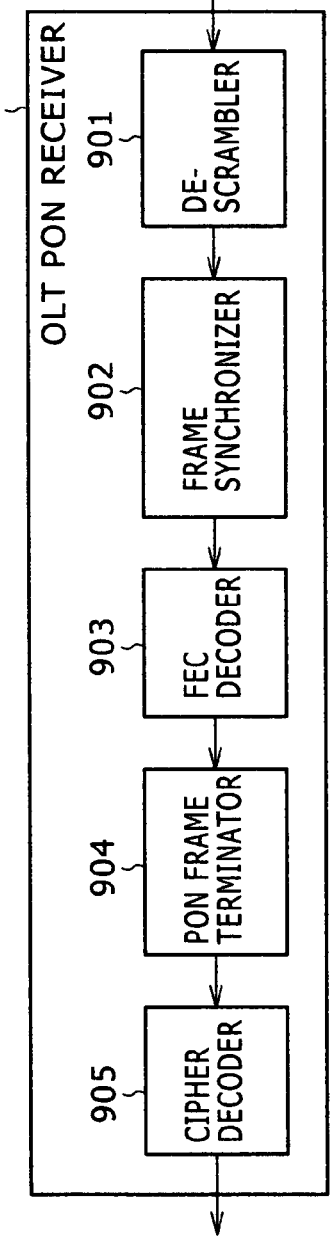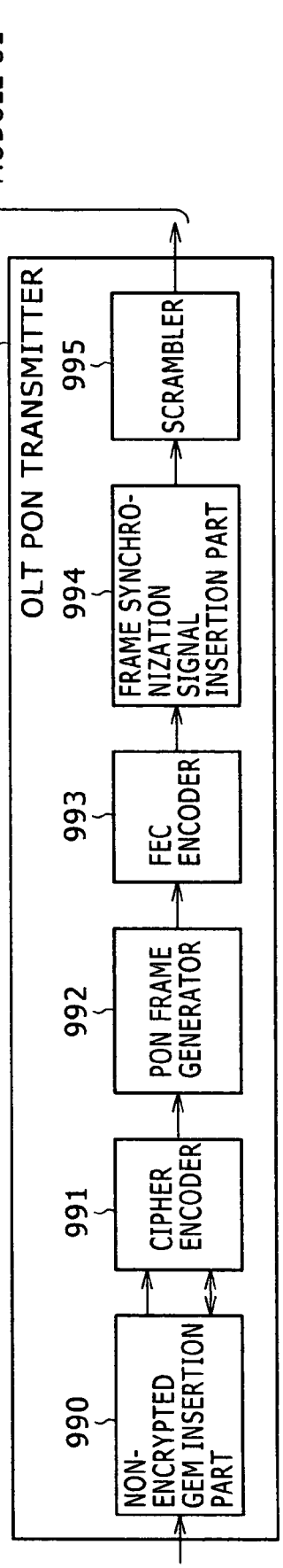

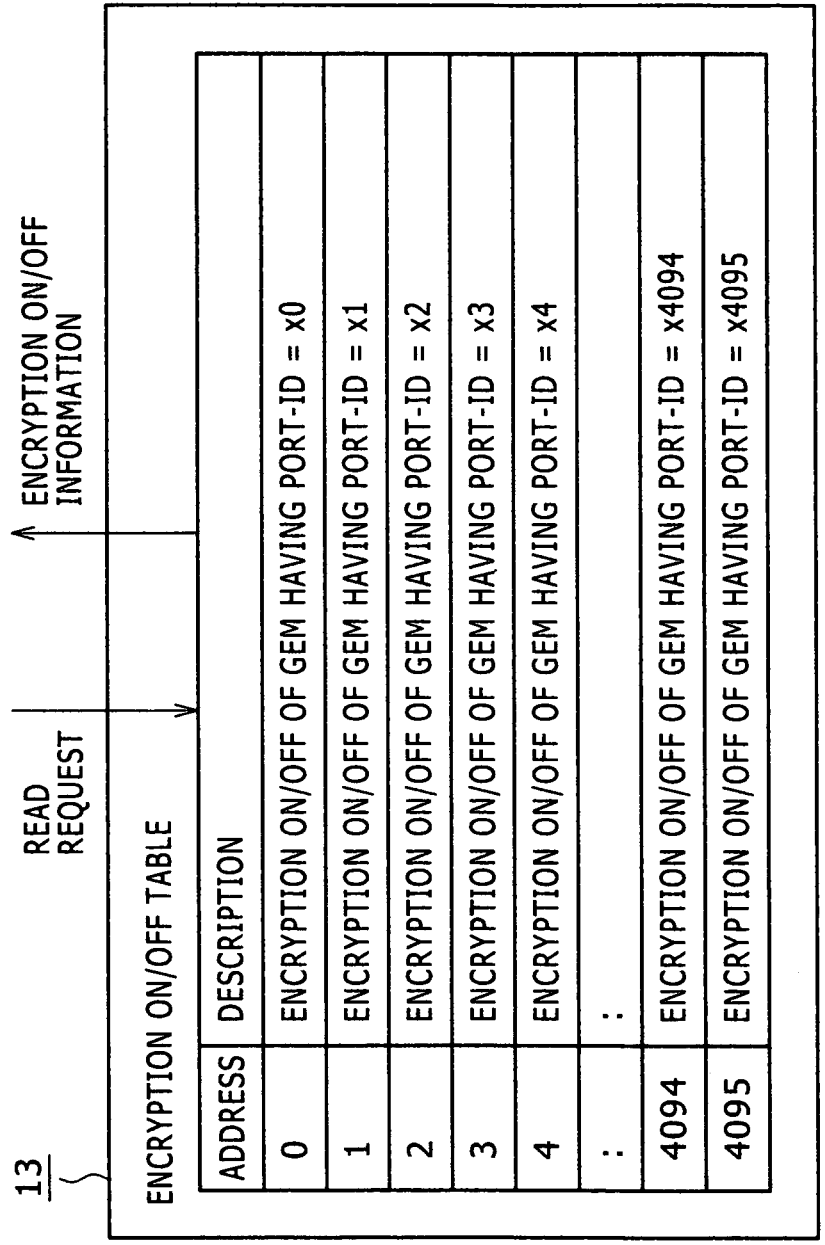

READ REQUEST →

↑ ADDRESS INFORMATION IN ENCRYPTION ON/OFF TABLE

| ADDRESS | DESCRIPTION |
|---------|-------------|
| 0 | ADDRESS IN ENCRYPTION ON/OFF TABLE AT WHICH ON/OFF INFORMATION FOR GEM WITH PORT-ID = 0 IS STORED |
| 1 | ADDRESS IN ENCRYPTION ON/OFF TABLE AT WHICH ON/OFF INFORMATION FOR GEM WITH PORT-ID = 1 IS STORED |
| 2 | ADDRESS IN ENCRYPTION ON/OFF TABLE AT WHICH ON/OFF INFORMATION FOR GEM WITH PORT-ID = 2 IS STORED |
| 3 | ADDRESS IN ENCRYPTION ON/OFF TABLE AT WHICH ON/OFF INFORMATION FOR GEM WITH PORT-ID = 3 IS STORED |
| 4 | ADDRESS IN ENCRYPTION ON/OFF TABLE AT WHICH ON/OFF INFORMATION FOR GEM WITH PORT-ID = 4 IS STORED |
| .. | .. |
| 4094 | ADDRESS IN ENCRYPTION ON/OFF TABLE AT WHICH ON/OFF INFORMATION FOR GEM WITH PORT-ID = 4094 IS STORED |
| 4095 | ADDRESS IN ENCRYPTION ON/OFF TABLE AT WHICH ON/OFF INFORMATION FOR GEM WITH PORT-ID = 4095 IS STORED |

ENCRYPTION KEY TABLE

| ADDRESS | DESCRIPTION |
|---------|-------------|
| 0 | ENCRYPTION KEY OF ONU HAVING ONU-ID = y0 |
| 1 | ENCRYPTION KEY OF ONU HAVING ONU-ID = y1 |
| 2 | ENCRYPTION KEY OF ONU HAVING ONU-ID = y2 |
| 3 | ENCRYPTION KEY OF ONU HAVING ONU-ID = y3 |
| 4 | ENCRYPTION KEY OF ONU HAVING ONU-ID = y4 |
| .. | .. |
| 62 | ENCRYPTION KEY OF ONU HAVING ONU-ID = y62 |
| 63 | ENCRYPTION KEY OF ONU HAVING ONU-ID = y63 |

READ REQUEST →

← ENCRYPTION KEY

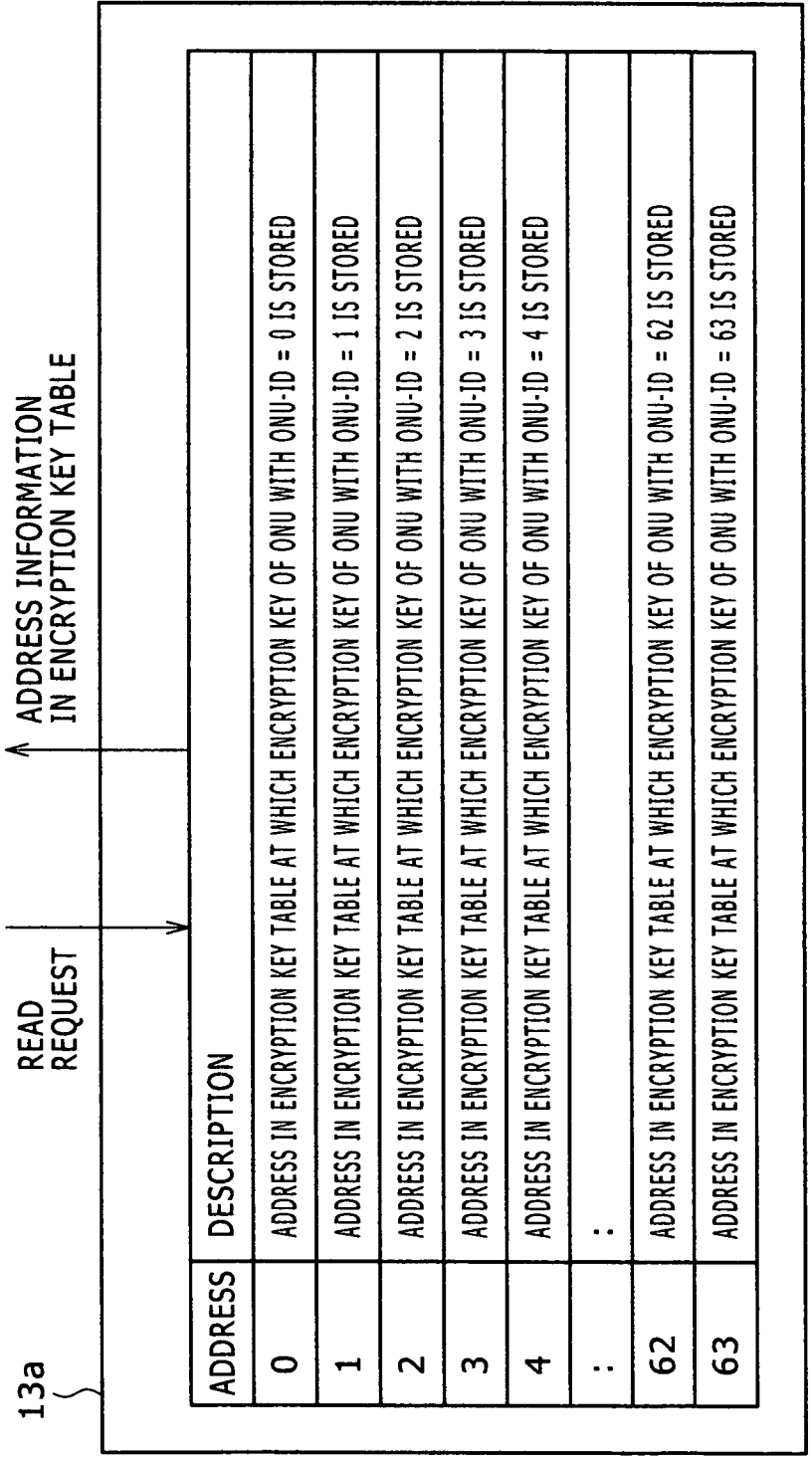

FIG.16

PORT-ID/ONU-ID MAPPING TABLE

| ADDRESS | DESCRIPTION |
|---|---|
| 0 | ONU-ID OF ONU TO WHICH GEM IS TRANSMITTED, HAVING PORT-ID = 0 |
| 1 | ONU-ID OF ONU TO WHICH GEM IS TRANSMITTED, HAVING PORT-ID = 1 |
| 2 | ONU-ID OF ONU TO WHICH GEM IS TRANSMITTED, HAVING PORT-ID = 2 |
| 3 | ONU-ID OF ONU TO WHICH GEM IS TRANSMITTED, HAVING PORT-ID = 3 |
| 4 | ONU-ID OF ONU TO WHICH GEM IS TRANSMITTED, HAVING PORT-ID = 4 |
| .. | .. |
| 4094 | ONU-ID OF ONU TO WHICH GEM IS TRANSMITTED, HAVING PORT-ID = 4094 |
| 4095 | ONU-ID OF ONU TO WHICH GEM IS TRANSMITTED, HAVING PORT-ID = 4095 |

READ REQUEST → 
← ONU-ID

25

ENCRYPTION APPARATUS

CLAIM OF PRIORITY

The present application claims priority from Japanese patent application serial no. 2006-344885, filed on Dec. 21, 2006, the content of which is hereby incorporated by reference into this application.

BACKGROUND OF THE INVENTION

The present invention relates to encryption apparatus and, particularly, to an encryption apparatus that encrypts packets having arbitrary lengths.

Of public communication networks for transferring data such as audio and video, there are used telephone subscriber network, ADSL, and other networks to implement an access network in which users are accommodated in a central office. Recently introduction of an optical access system has been started.

A known example of the optical access system is PON (Passive Optical Network) as a mode of 1 to n connection between the central office side and the subscriber side. The PON provides data communication between an OLT (Optical Line Terminal) located in a central office and plural ONTs (Optical Network Terminals) located in subscribers homes, using a shared bandwidth in such a way that each optical wavelength is assigned for ascending and descending. In the case of signals on the descending side from the OLT to the ONTs, an optical signal is split into signals halfway through in a splitter. The ONT side extracts only a signal addressed to the own terminal. Thus communication is established therebetween. In the case of signals on the ascending side, the OLT notifies the ONTs of transmission time timing. The ONTs transmit signals to the OLT in accordance with the timing. In this way plural ONTs communicate with the OLT by sharing a single wavelength.

Known examples of such an optical access system are B-PON (Broadband PON), A-PON (ATM PON), GE-PON (Gigabit Ether PON), and G-PON (Gigabit-capable PON). Particularly G-PON attracts attention for the following reasons. That is, G-PON is the fastest with a maximum ascending speed of 1.25 Gbits/s and a maximum descending speed of 2.5 Gbits/s, serving plural protocols by adopting a native GEM (Gigabit-capable Encapsulation Method/G-PON Encapsulation Method) that provides support for ATM, Ethernet, and WDM protocols.

In the G-PON, a downlink PON frame has a fixed length and a downlink PON header has a fixed length. On the other hand, an uplink PON frame has a variable length and an uplink PON header has a nearly fixed length. As for encryption, it is prescribed for G-PON that downlink signals be encrypted in compliance with Advanced Encryption Standard (AES)-128. However, there is no standard for encrypting uplink signals which are transmitted in variable-length frames. Nevertheless, encrypting variable-length frames will be necessary in future. To comply with ITU-T G984 3, a sequence of GEM packets having arbitrary lengths (especially, GEM packets with a length equaling a minimum unit of 6 bytes) must be taken into consideration.

An AES-128 cipher which is used for G-PON frames has a key length of 128 bits and an encryption block length of 128 bits and needs 10 rounds of calculation. If one round of calculation can be executed in one clock period, calculation for one encryption block can be completed in 11 clock periods including data loading. In other words, cryptographic calculation requires a given processing time which is denoted by "P" in the drawings which will be referred to later. Considering that P=11 in AES-128 and a throughput of 2.4 Gbps for processing GEM packets having arbitrary lengths, two planes of cryptographic calculation are needed, when an 8-bit parallel circuit which processes one byte per clock is used. Four planes of cryptographic calculation are needed, when a 16-bit parallel circuit which processes two bytes per clock is used.

With current VLSI technology, the operating rate of components such as transistors is, at a maximum, on the order of 150 Mbps for one data line (for one bit). To realize the throughput of 2.4 Gbits (or 2.4 GHz) with an ordinary large scale integrated circuit, a 16-bit parallel circuit architecture which processes 16 data lines simultaneously in one clock period is necessary. In consequence, in the case of implementation using a less costly manufacturing process and an inexpensive chip size (10 mm×10 mm), a cryptographic calculation circuit with four planes of cryptographic calculation occupies 70% of the whole chip area and a PON processing circuit and an Ether processing circuit cannot be packed in the same chip. Even if a more costly manufacturing process with a higher packaging density is used, the cryptographic calculation circuit still occupies about 40% of the chip area. To integrate the PON processing circuit and an Ether processing circuit into the same chip, quite an expensive chip size (15 mm×15 mm) has to be used.

SUMMARY OF THE INVENTION

The present invention provides an encryption apparatus in which it is possible to reduce the size of the cryptographic calculation circuit to which variable-length frames are input.

The above-mentioned challenge is achievable by an encryption apparatus including an idle data inserting unit that takes input of a frame including a fixed-length header and a variable-length payload and an encrypting unit that receives an output of the idle data inserting unit, wherein, if the length of a block to be processed, included in the payload, is less than a predetermined value, the idle data inserting unit appends idle data following the block and transmits the frame including the block padded with the idle data to the encrypting unit.

Also, the challenge is achievable by an encryption apparatus including an idle data inserting unit that takes input of a frame including a fixed-length header and a variable-length payload and an encrypting unit that receives an output of the idle data inserting unit, wherein, if the sum of the first length of a first block to be processed and the second length of a second block to be processed, included in the payload, is less than a predetermined value, the idle data inserting unit appends idle data following the second block and transmits the frame including the first and second blocks padded with the idle data to the encrypting unit, and the encrypting unit includes a first cryptographic calculator and a second cryptographic calculator and performs cryptographic calculation alternately using the first cryptographic calculator and the second cryptographic calculator for each unit received in the frame received from the idle data inserting unit.

BRIEF DESCRIPTION OF THE DRAWINGS

Preferred embodiments of the present invention will now be described in conjunction with the accompanying drawings, in which:

FIGS. 7A and 7B are block diagrams of a PON receiver and a PON transmitter in the ONT;

FIG. 12 illustrates an encryption ON/OFF table;

FIG. 13 illustrates an auxiliary table for the encryption ON/OFF table;

FIG. 14 illustrates an encryption key table;

FIG. 15 illustrates an auxiliary table for the encryption key table;

FIG. 16 illustrates a Port-ID/ONU-ID table;

DESCRIPTION OF THE PREFERRED EMBODIMENTS

Figure 1:
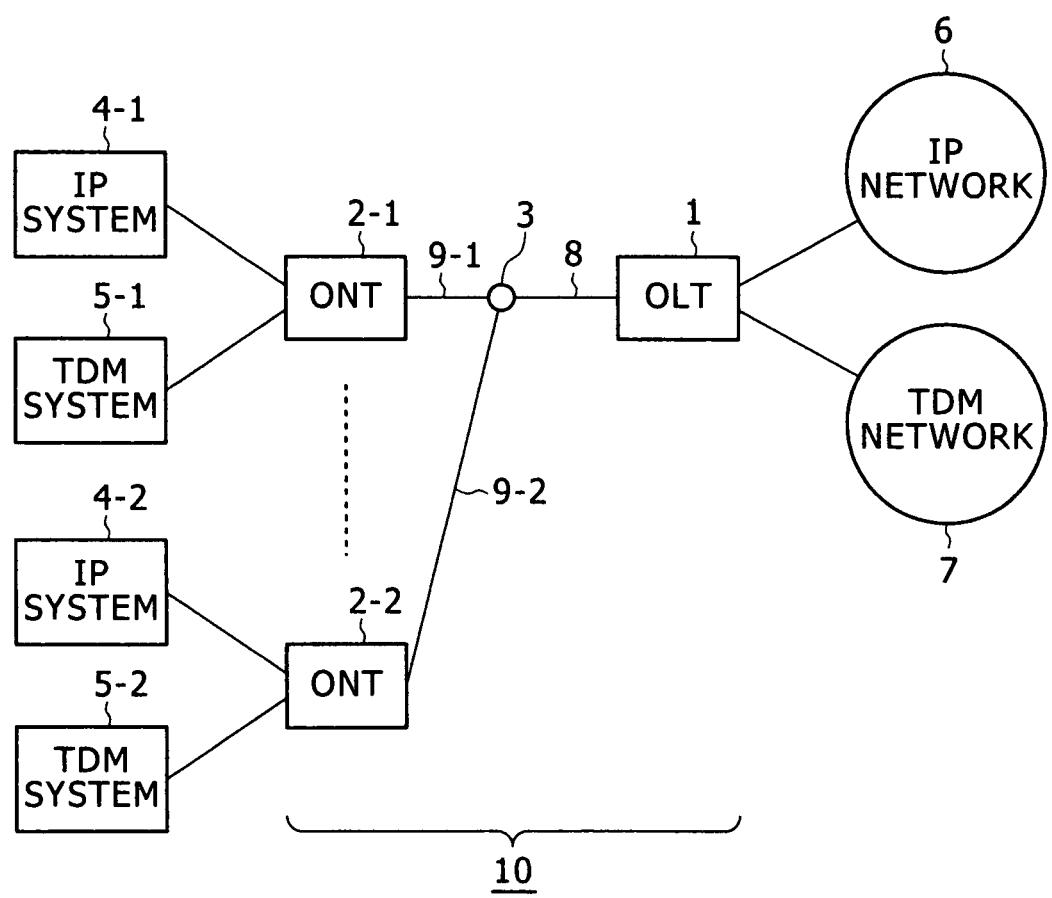
FIG. 1 is a block diagram of an optical access network.

A mode for carrying out the invention will be described below based on preferred embodiments with reference to the accompanying drawings. Incidentally substantially like parts are denoted by like reference numerals and the description will not be repeated.

FIG. 1 is a block diagram of an optical access network. An optical access network 10 includes: an optical line terminal (OLT) 1; an optical network terminal (ONT) 2; a splitter 3; a trunk line fiber 8 between the OLT 1 and the splitter 3; and a subscriber fiber 9 between the splitter 3 and the ONT 2. The ONT 2 is connected to an IP system 4 and a TDM system 5. The OLT 1 is connected to an IP network 6 and a TDM network 7.

A TDM signal from the TDM system 5 is accommodated in the TDM network 7 through the optical access network 10. A signal from the IP system 4 is accommodated in the IP network 7 through the optical access network 10. These signals are referred to as ascending signals.

A TDM signal from the TDM network 7 is accommodated in the TDM system 5 through the optical access network 10. A signal from the IP network 6 is accommodated in the IP system 4 through the optical access network 10. These signals are referred to as descending signals.

Incidentally in the block diagrams of FIG. 2 to FIG. 7 described below, the signal flow directions (ascending, descending) are in accordance with FIG. 1.

Figure 2:
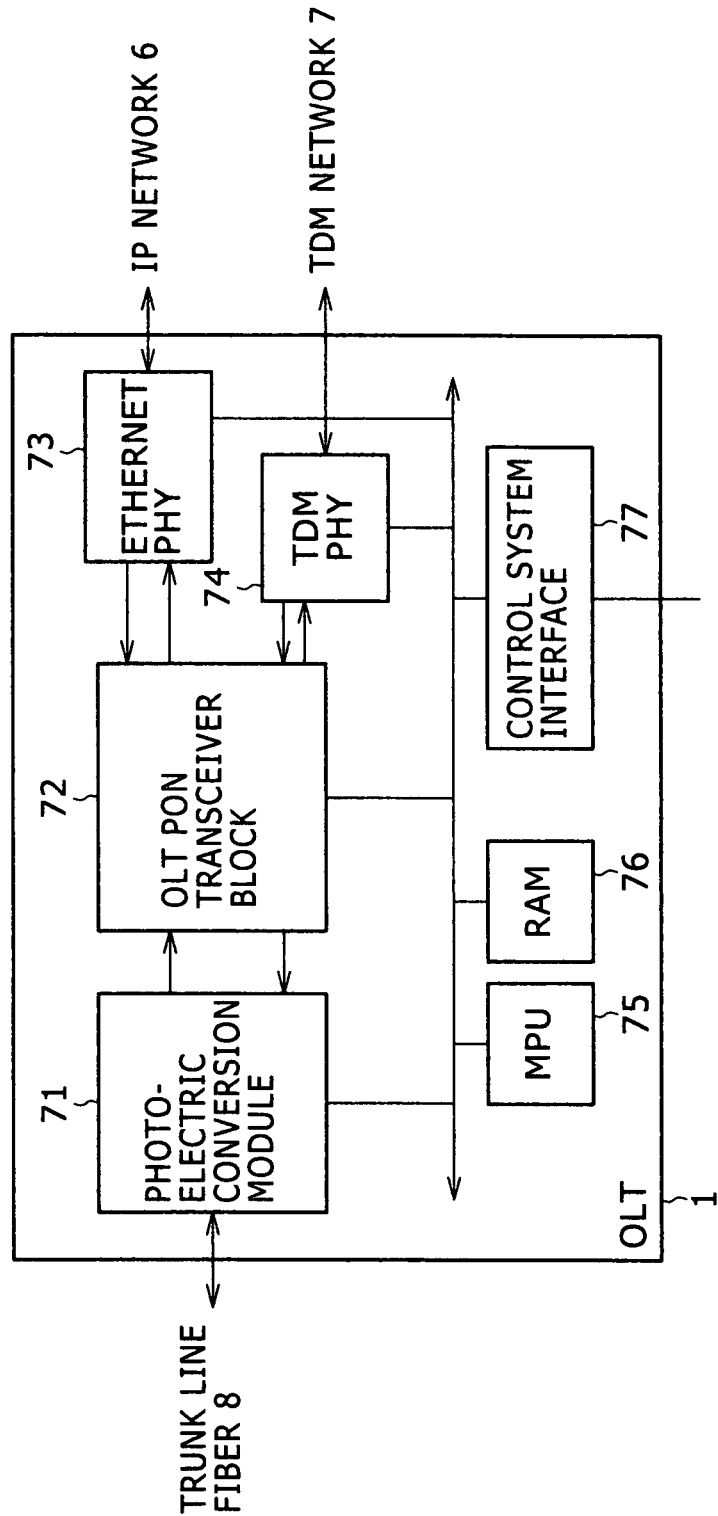
FIG. 2 is a block diagram of an OLT.

FIG. 2 is a block diagram of the OLT. An ascending optical signal from the trunk line fiber 8 is converted into an electrical signal by a photoelectric conversion module 71, and is subjected to GEM termination in an OLT PON transceiver block 72. The converted electrical signal is converted into an Ethernet signal and a TDM signal by the GEM termination. The Ethernet signal is transmitted to the PI network 6 through an Ethernet PHY 73, while the TDM signal is transmitted to the TDM network 7 through a TDM PHY 74.

Descending signals arriving from the IP network 6 and the TDH network 7 are received by the Ethernet PHY 73 and the TDM PHY 74, respectively, and are transmitted to the OLT PON transceiver block 72. The OLT PON transceiver block 72 assembles a GEM frame and then transmits to the trunk line fiber 8 through the photoelectric conversion module 71. An MPU 75 is a microcomputer for controlling the OLT 1, a RAM 76 is a RAM, and a control system interface 77 is an interface for setting to the OLT 1 from the outside.

Figure 3:
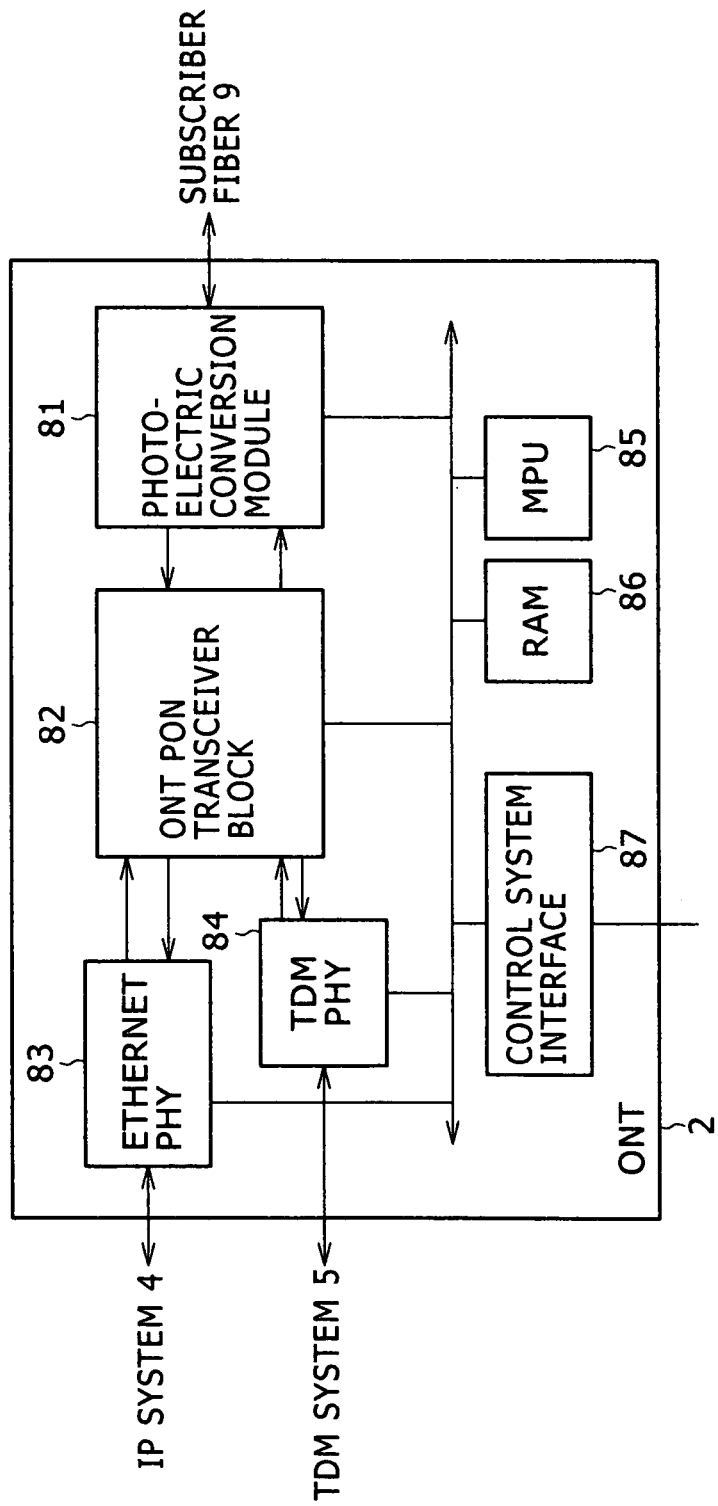
FIG. 3 is a block diagram of an ONT.

FIG. 3 is a block diagram of the ONT. A descending optical signal from the subscriber fiber 9 is converted into an electrical signal by a photoelectric conversion module 81, and is subjected to GEM termination in an ONT PON transceiver block 82. The ONT PON transceiver block 82 converts the converted electrical signal into an Ethernet signal and a TDM signal. The Ethernet signal is transmitted to the IP system 4 through an Ethernet PHY 83. The TDM signal is transmitted to the TDM system 5 through a TDM PHY 84.

Ascending signals from the IP system 4 and TDM system 5 are received by the Ethernet PHY 83 and the TDM PHY 84, respectively, and are transmitted to the ONT PON transceiver block 82. The ONT PON transceiver block 82 assembles a GEM frame and then transmits to the subscriber fiber 9 through the photoelectric conversion module 81. An MPU 85 is a microcomputer for controlling the ONT 2, a RAM 86 is a RAM, and a control system interface 87 is an interface for setting to the ONT 2 from the outside.

Figure 4:
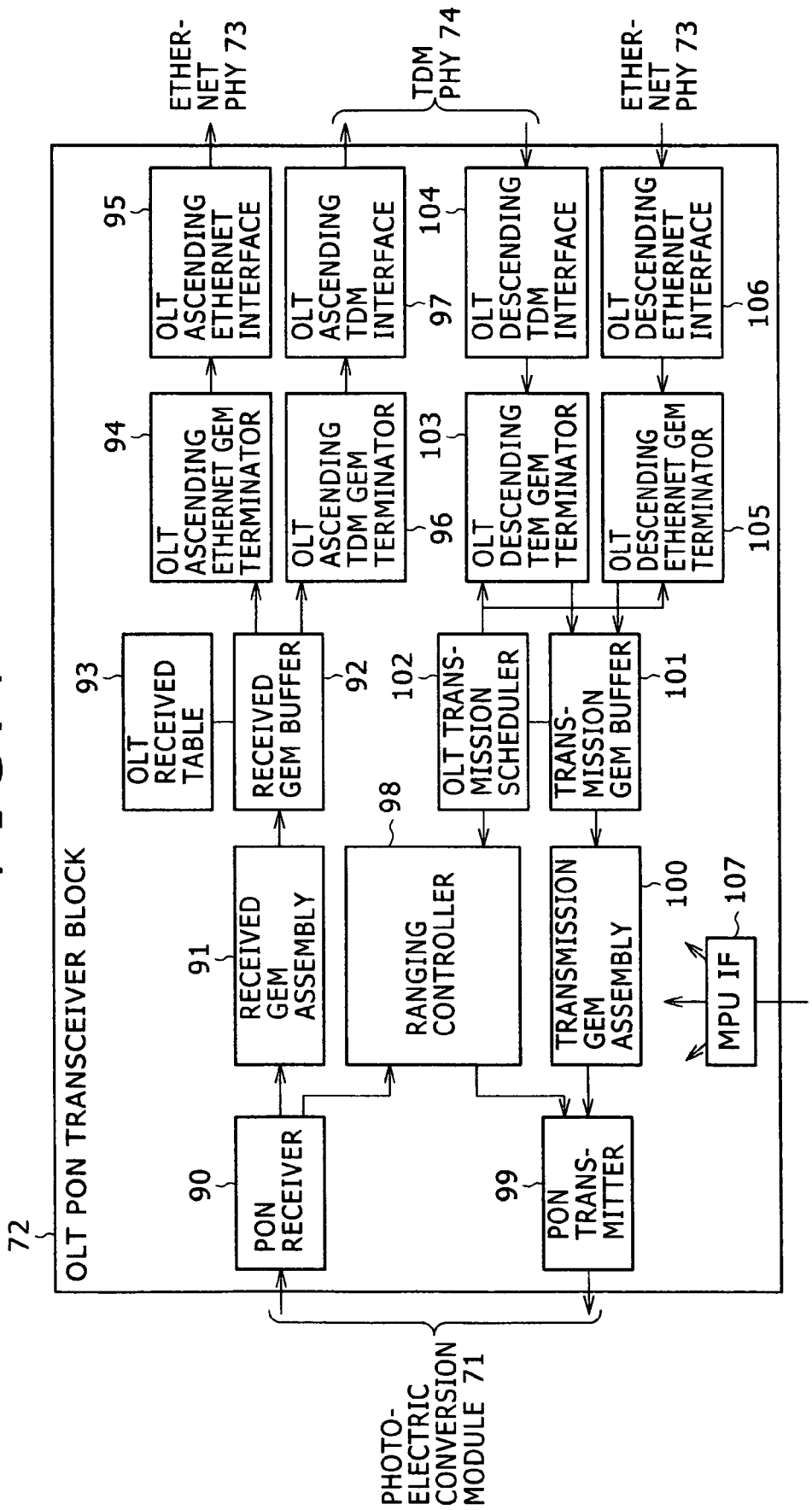
FIG. 4 is a block diagram of a PON transceiver block of the OLT.

FIG. 4 is a block diagram of the PON transceiver block of the OLT. The ascending PON frame signal from the photoelectric conversion module 71 is subjected to a synchronization process and a GEM cutting-out process by a PON receiver 90. Then the cut out payload is transmitted to a received GEM assembly 91. The received GEM assembly 91 assembles the transmitted GEM that is divided into plural short term frames. Then the assembled GEM is stored in a received GEM buffer 92, and is sorted into an OLT ascending Ethernet GEM terminator 94 and an OLT ascending TDM GEM terminator 96, according to the table information of an OLT received table 93.

The OLT ascending Ethernet GEM terminator 94 extracts the Ethernet frame from the GEM frame, and transmits the extracted Ethernet frame to the Ethernet PHY 73 through an OLT ascending Ethernet interface 95. The OLT ascending TDM GEM terminator 96 extracts the TDM signal from the GEM frame, and transmits the extracted TDM signal to the TDM PHY 74 through an OLT ascending TDM interface 97 at a desired timing.

With respect to the descending signals, an OLT descending TDM interface 104 receives the TDM signal from the TDM PHY 74. An OLT descending TDM GEM terminator 103 generates a GEM by buffering the TDM signal. An OLT descending Ethernet interface 106 receives the Ethernet frame from the Ethernet PHY 73. An OLT descending Ethernet GEM terminator 105 generates a GEM. An OLT transmission scheduler 102 controls the OLT descending TDM GEM terminator 103 to periodically transmit the GEM of the TDM signal to a transmission GEM buffer 101. The OLT transmission scheduler 102 also controls the OLT descending Ethernet GEM terminator 105 to transmit the GEM of the Ethernet signal to the transmission GEM buffer 101 at an idle timing. The OLT transmission scheduler 102 controls the transmission GEM buffer 101 to periodically transfer the GEM of the TDM signal and the GEM of the Ethernet signal to a transmission GEM assembly 100. The transmission GEM assembly 100 assembles the GEM for the amount of payload of the PON frame, and transfers the assembled GEM to a PON transmitter 99. The PON transmitter 99 generates a header and then transmits the PON frame.

When performing ranging as a measurement of the distance between the OLT 1 and the ONT 2, a ranging controller 98 transmits a ranging signal from the PON transmitter 99 at a timing permitted by the OLT transmission scheduler 102. The ranging is completed when a response is returned from the ONT 2 to the ranging controller 98 through the PON receiver 90.

Incidentally, an MPU interface 107 intermediates the control of the MPU 75 to each of the control blocks.

Figure 5:
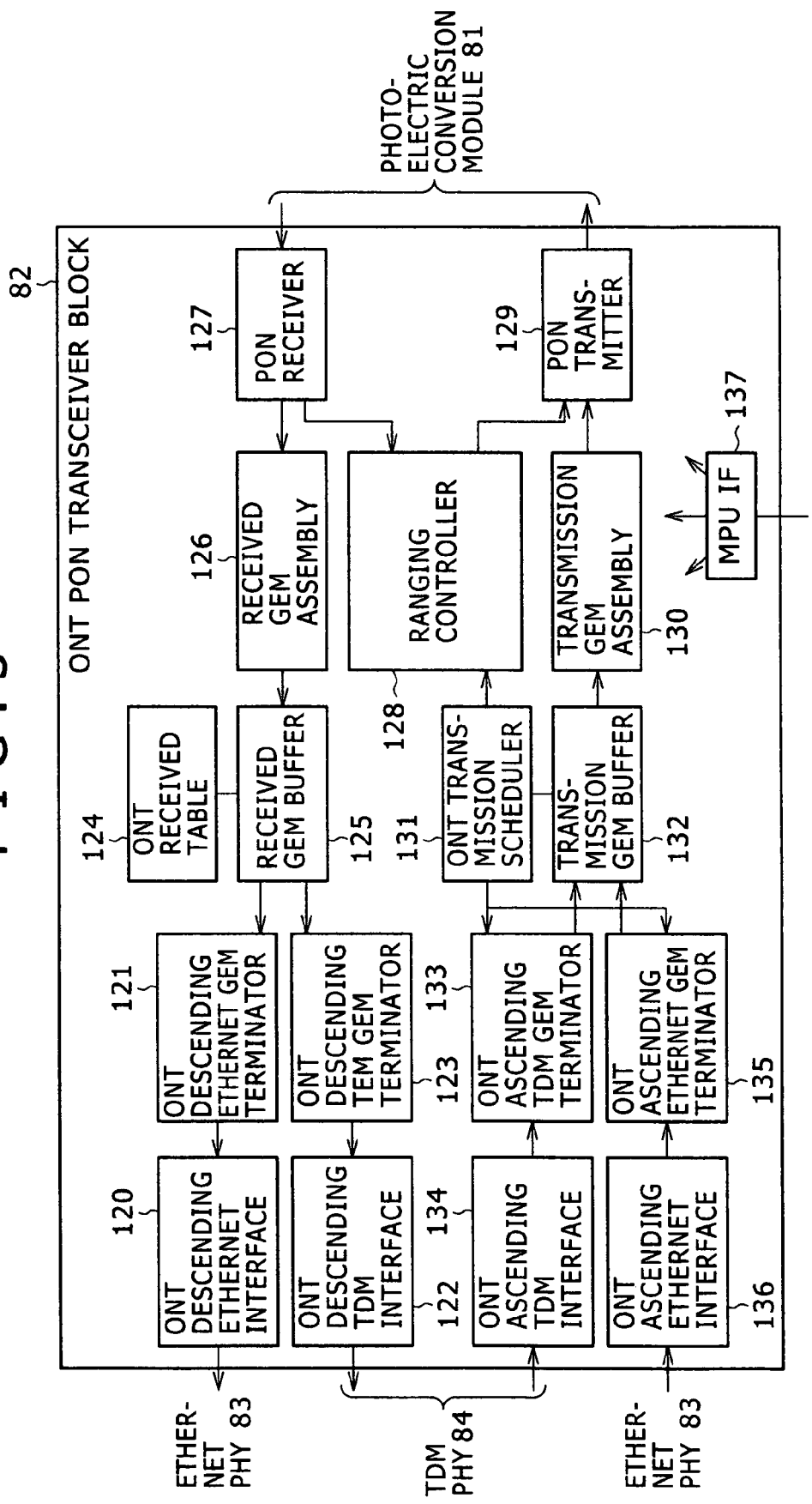
FIG. 5 is a block diagram of a PON transceiver block of the ONT.

FIG. 5 is a block diagram of the PON transceiver block of the ONT. The descending signal from the photoelectric conversion module 81 is received by a PON receiver 127. The PON receiver 127 performs a synchronization process and a GEM cutting-out process. A received GEM assembly 126 assembles the transmitted GEM that is divided into plural short term frames. The assembled GEM is stored in a received GEM buffer 125, and is sorted into an ONT descending Ethernet GEM terminator 121 and an ONT descending TDM GEM terminator 123, according to the table information of an ONT received table 124. The ONT descending Ethernet GEM terminator 121 extracts the Ethernet frame from the GEM. The extracted Ethernet frame is transmitted to the Ethernet PHY 83 through an ONT descending Ethernet interface 120.

The ONT descending TDM GEM terminator 123 extracts the TDM signal from the GEM. The extracted TDM signal is transmitted to the TDM PHY 84 through an ONT descending TDM interface 122 at a predetermined timing.

With respect to the ascending signals, an ONT ascending TDM interface 134 receives the TDM signal. An ONT ascending TDM GEM terminator 133 assembles the GEM by buffering the TDM signal. An ONT ascending Ethernet interface 136 receives the Ethernet frame. An ONT ascending Ethernet GEM terminator 135 generates a GEM. An ONT transmission scheduler 131 controls the ONT ascending TDM GEM terminator 133 to periodically transfer the GEM of the TDM signal to a transmission GEM buffer 132. The ONT transmission scheduler 131 also controls the ONT ascending Ethernet GEM terminator 135 to transfer the GEM of the Ethernet signal to the transmission GEM buffer 132 at an idle timing. The ONT transmission scheduler 131 controls the transmission GEM buffer 132 to periodically transfer the GEM of the TDM signal and the GEM of the Ethernet signal to a transmission GEM assembly 130. The transmission GEM assembly 130 assembles the GEM for the amount of payload of the PON frame, and transfers the assembled GEM to a PON transmitter 129. The PON transmitter 129 generates a header and then transmits the PON frame.

Upon request of the ranging, a ranging controller 128 processes a ranging request signal received by the PON receiver 127, and returns a ranging reception signal through the PON transmitter 129.

An MPU interface 137 is an interface via which the MPU 85 controls each block. The received GEM assembly 126 discards idle GEM data.

Figures 6A, 6B:
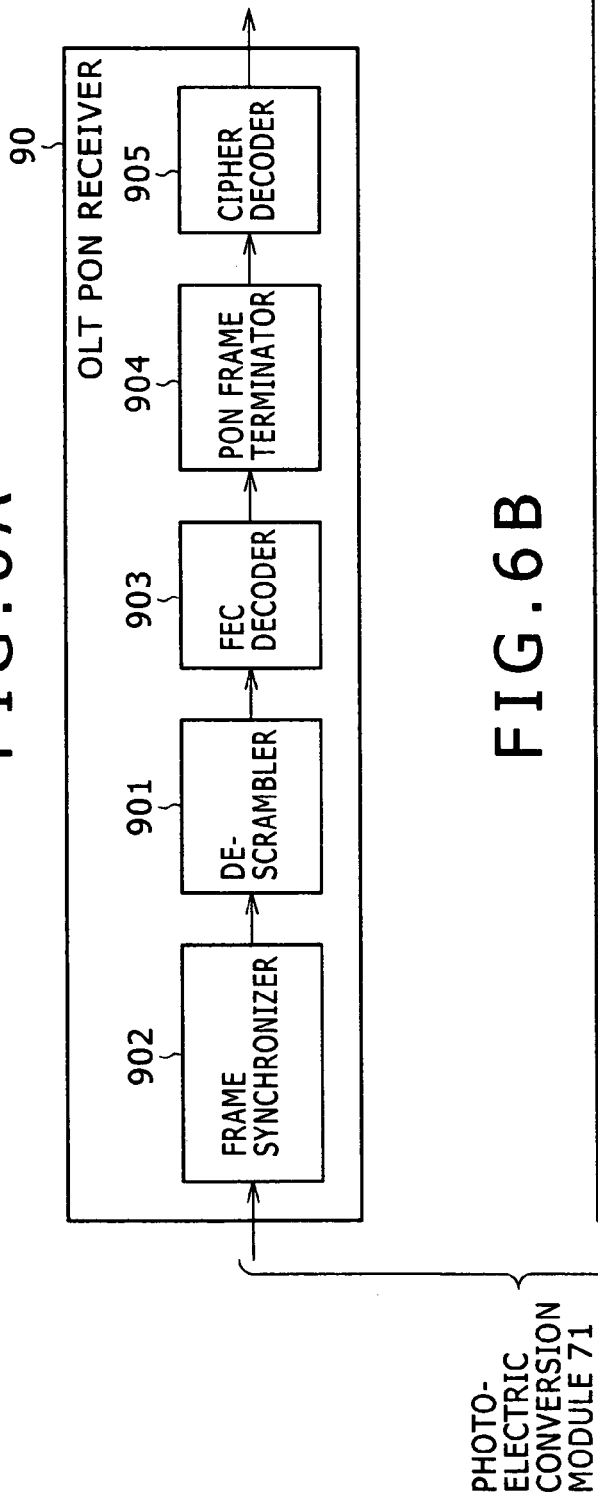
FIGS. 6A and 6B are block diagrams of a PON receiver and a PON transmitter in the OLT.

FIGS. 6A and 6B are block diagrams of the PON receiver and the PON transmitter in the OLT. FIGS. 7A and 7B are block diagrams of the PON receiver and the PON transmitter in the ONT. In FIG. 6A, the OLT PON receiver 90 includes: a descrambler 901 for releasing the scramble of the ascending signal; a frame synchronizer 902 for providing a frame synchronization of the descrambled signal; an FEC decoder 903 for separating an information word and an FEC (Forward Error Correction) parity to correct errors of the information word; a PON frame terminator 904; and a cipher decoder 905 for decoding ciphers. In FIG. 6B, the OLT PON transmitter 99 is composed of a non-encrypted GEM insertion part 990 which inserts idle GEM data into a GEM, a cipher encoder 991 which encrypts downlink signals, a PON frame generator 992 which constructs a PON frame of encrypted data, an FEC encoder 993 which adds an FEC parity to a PON frame, a frame sync signal insertion part 994 which inserts a frame sync signal, and a scrambler 995.

The non-encrypted GEM insertion part 990 may be placed in the transmission GEM assembly 100 instead of the OLT PON transmitter 99.

The ONT PON receiver 127 in FIG. 7A has the same configuration as the OLT PON receiver 90 in FIG. 6A, except for the signal flow. Also the ONT PON transmitter 129 in FIG. 7B has the same configuration as the OLT PON transmitter 99 in FIG. 6B, except for the signal flow. Thus their description will be omitted.

Incidentally, when no code is used on the ascending side, both the code decoder 905 of the OLT PON receiver 90 and the code encoder 991 of the ONT PON transmitter 129 are not needed.

Figure 8:
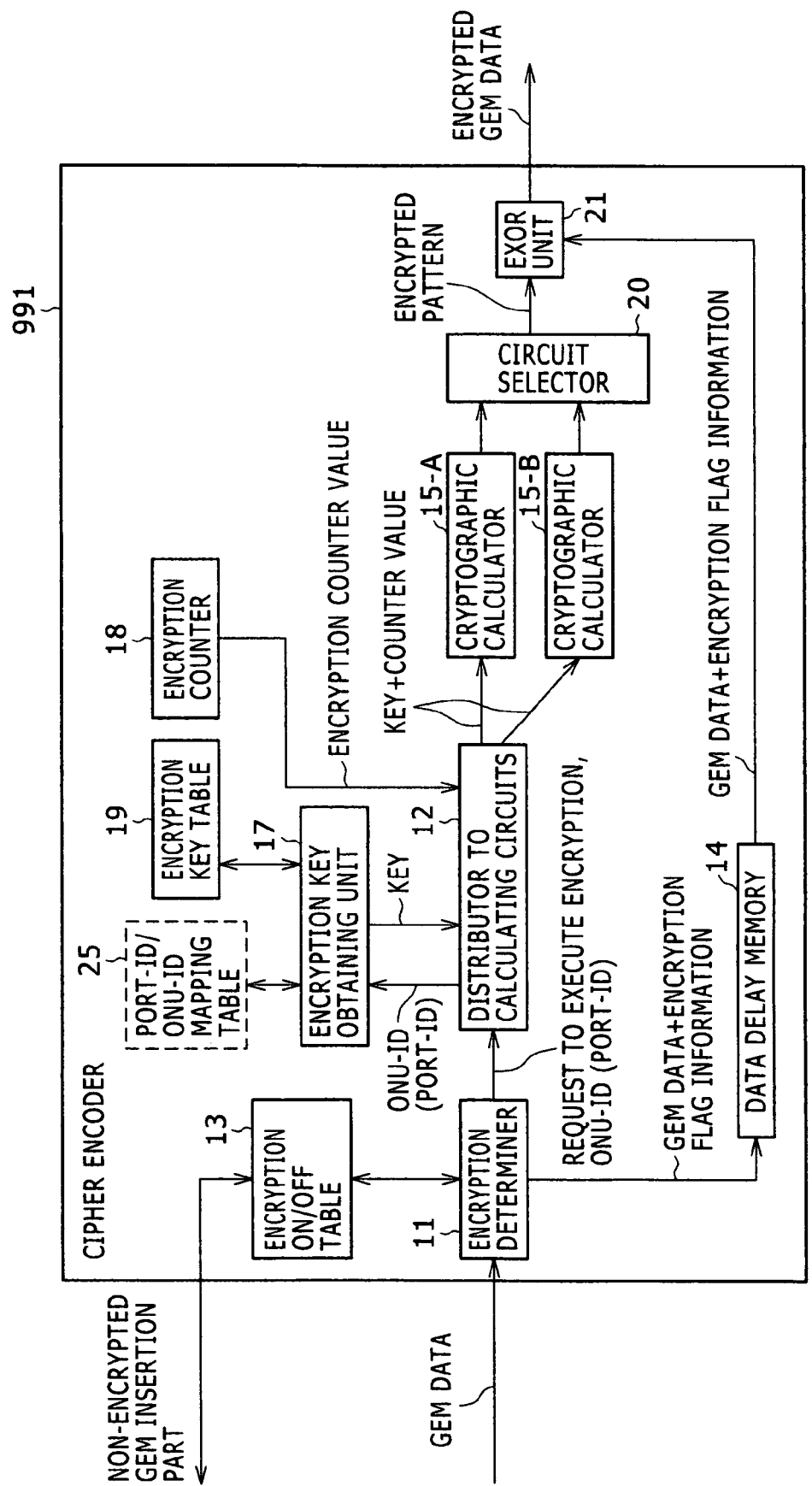
FIG. 8 is a block diagram of a cipher encoder.

FIG. 8 is a block diagram of the cipher encoder. In FIG. 8, the cipher encoder 991 receives GEM data and delivers encrypted GEM data. The cipher encoder 991 is composed of an encryption determiner 11 which receives GEM data, a distributor to calculation circuits 12 connected to the encryption determiner 11, an encryption key obtaining unit 17 which returns a key in response to ONU-ID (which is the ID of an ONT, generally termed ONU-ID) from the distributor to calculation circuits 12, cryptographic calculators 15-A, B which encrypt GEM data distributed thereto by the distributor to calculation circuits 12, a circuit selector 20 which selects either of two results of cryptographic calculation, an EXOR unit 21 which performs an exclusive-OR operation between output of a data delay memory 14 connected to the encryption determiner 11 and output of the circuit selector 20, an encryption key table 19 to which the encryption key obtaining unit 17 refers, an encryption counter 18 which supplies a counter value to the distributor to calculation circuits, and an encryption ON/OFF table 13 to which the encryption determiner 11 refers. The cipher encoder 991 may include a Port-ID/ONU-ID mapping table 25 which associates a Port-ID with an ONU-ID.

Encryption is always calculated in units of encryption blocks within a GEM payload. Encryption key change and encryption ON/OFF switching may occur per GEM, but does not occur per encryption block within a GEM.

128-bit encryption keys and a 128-bit encryption counter are assumed, but not restrictive. As defined in the AES standard, 96 bits or 256 bits other than 128 bits may be applied. Although an AES cipher is assumed to be used in a counter mode, it may be used in another mode. In any case, it remains unchanged that the size of the cryptographic calculation circuit can be reduced.

The encryption determiner 11 refers to the encryption ON/OFF table 13, using a key of Port-ID information specified in the header of received GEM data. The encryption determiner 11 determines whether the GEM is to be encrypted from the encryption ON/OFF table 13. The encryption determiner 11 passes the result of the determination (encryption flag information) along with the GEM data to the data delay memory 14. Upon determining that the GEM is to be encoded, the encryption determiner 11 passes a request to execute encryption, Port-ID, and ONU-ID to the distributor to calculation circuits 12. The ONU-ID may be received from the transmission GEM assembly 100 which assigns the GEM header at the preceding stage or the ONU-ID may be retrieved based on Port-ID within the cipher encoder 991. In the latter case, the ONU-ID is retrieved from the Port-ID/ONU-ID mapping table 25.

The distributor to calculation circuits 12, when receiving the request to execute encryption from the encryption determiner 11, causes the calculation circuits to calculate a encryption pattern to be put on the GEM. The distributor to calculation circuits 12 sends the ONU-ID to the encryption key obtaining unit 17 and receives the encryption key of the ONU. The distributor to calculation circuits 12 may passes Port-ID to the encryption key obtaining unit 17, instead of passing the ONU-ID.

The distributor to calculation circuits 12 passes the encryption key and the encryption counter value to one of the two planes of the cryptographic calculators 15-A, B which can start calculation and requests the calculator to start calculation. Simply, the cryptographic calculators A and B may be used alternately. The distributor to calculation circuits 12 performs distribution between the calculators at proper timings in units of encryption blocks.

The encryption key obtaining unit 17 refers to the encryption key table 19 and obtains an encryption key belonging to the ONU-ID from the distributor to calculation circuits 12. If receiving Port-ID instead of ONU-ID, the encryption key obtaining unit 17 first refers to the Port-ID/ONU-ID mapping table 25 and retrieves the ONU-ID. Then, it refers to the encryption key table 19 and retrieves the encryption key.

The encryption counter 18 generates a counter value for use of an AES cipher in the counter mode and passes the counter value to the distributor to calculation circuits 12. A counter value of the encryption counter 18 is generated as a value that is uniquely determined from a super-frame counter value of a PON frame in which a GEM is mapped and a time slot in which the GEM header is mapped within the PON frame, as specified in ITU-T Recommendation G.984.3.

The cryptographic calculators 15 execute cryptographic calculation in counter mode based on the AES standard. The calculators take input of a 128-bit encryption counter value and a 128-bit encryption key and generate and output a 128-bit encryption pattern after a predetermined period of time (after P clocks). P is longer than the time taken for 10 rounds of calculation required for the AES algorithm and is normally 10-12 clock periods. This time does not depend on the counter mode.

The circuit selector 20 selects between an output from the cryptographic calculator 15-A and an output from the cryptographic calculator 15-B. The circuit selector 20 makes this selection according to the scheme of calculation task distribution performed by the distributor to calculation circuits 12. Relative to the timing of distribution done by the distributor to calculation circuits, the timing of selection by the circuit selector is delayed by a predetermined period of time required for cryptographic calculation. The data delay memory 14 buffers received GEM data and encryption flag information for the fixed time period required for cryptographic calculation and outputs them at a delayed time.

When GEM data is to be encrypted, the EXOR unit 21 performs an exclusive-OR operation on a bit-by-bit basis between the encryption pattern from the circuit selector 20 and the GEM data from the data delay memory 14. When GEM data is not to be encrypted, it outputs GEM data as is without performing the exclusive-OR operation. Which case is true is determined from the encryption flag information received along with the GEM data from the data relay memory 14. If an encryption block is shorter than 16 bytes, the EXOR unit 21 performs an exclusive OR operation between an effective portion of the encryption pattern, including a bit sequence from the most significant bit equaling the encryption block length, and the data in the encryption block, ignoring the remaining bits of the encryption pattern.

Figure 9:
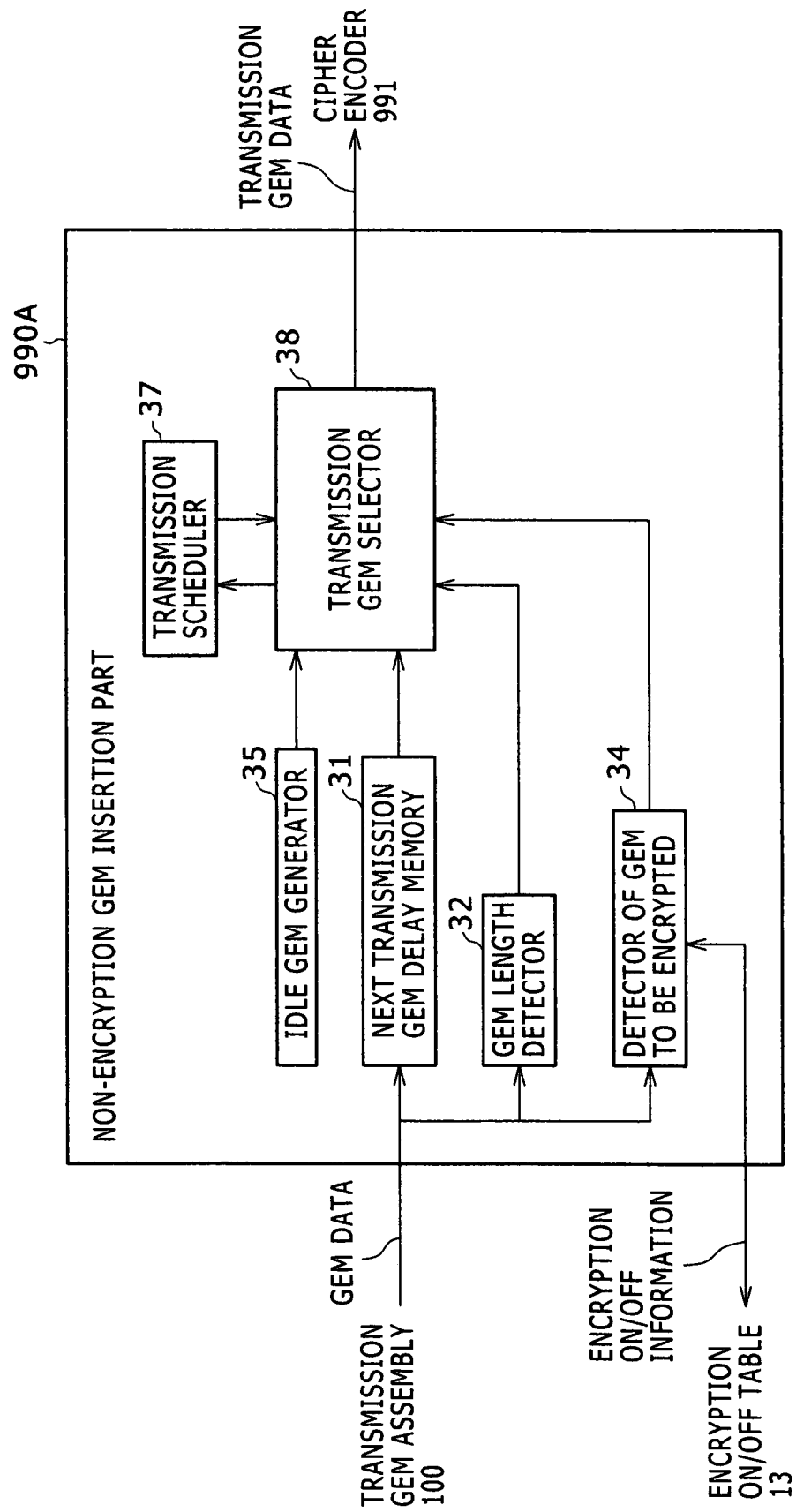
FIG. 9 is a block diagram of a non-encrypted GEM insertion part that determines whether to insert idle GEM data based on GEM length.
Figure 10:
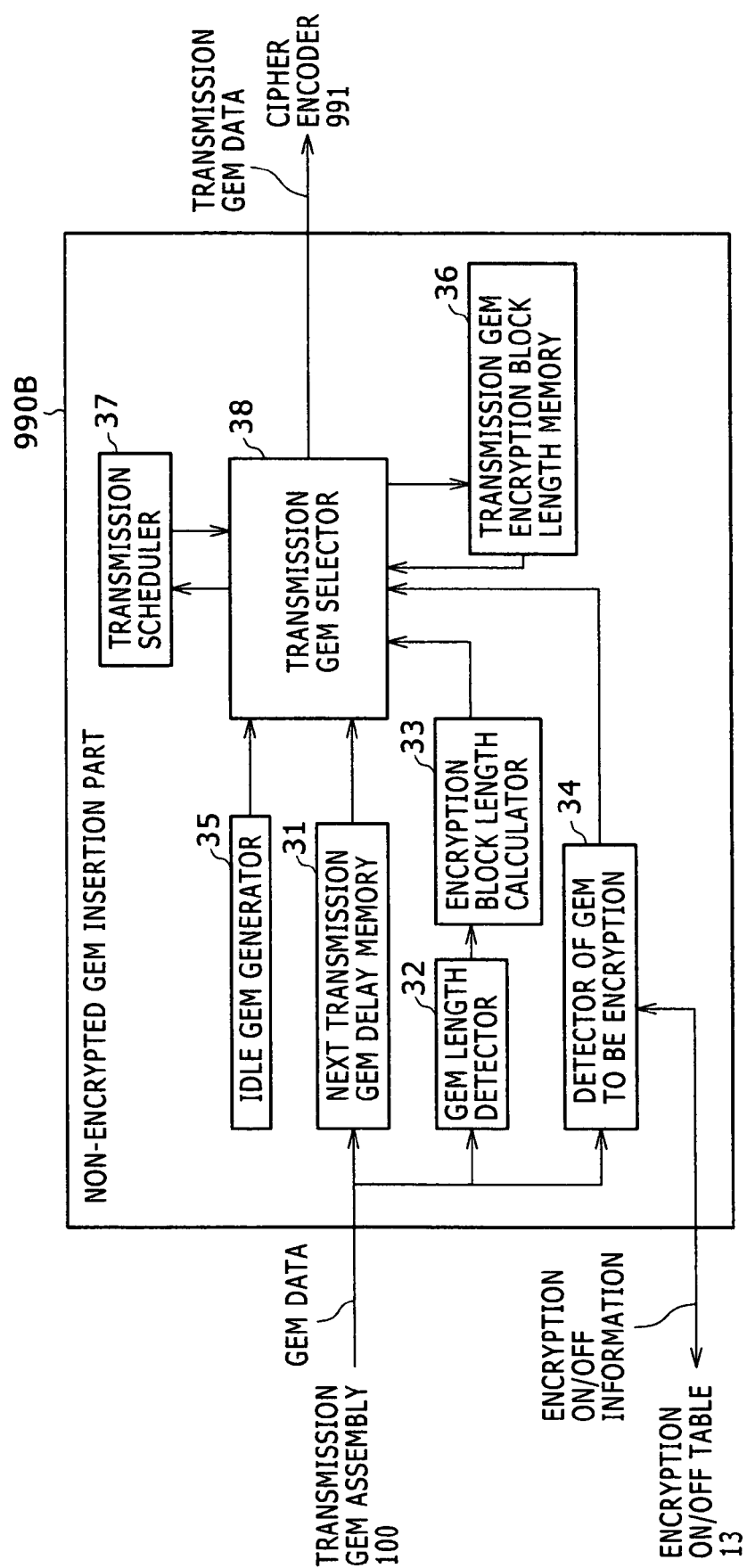
FIG. 10 is a block diagram of a non-encrypted GEM insertion part that determines whether to insert idle GEM data based on an encryption block integration value.
Figure 11:
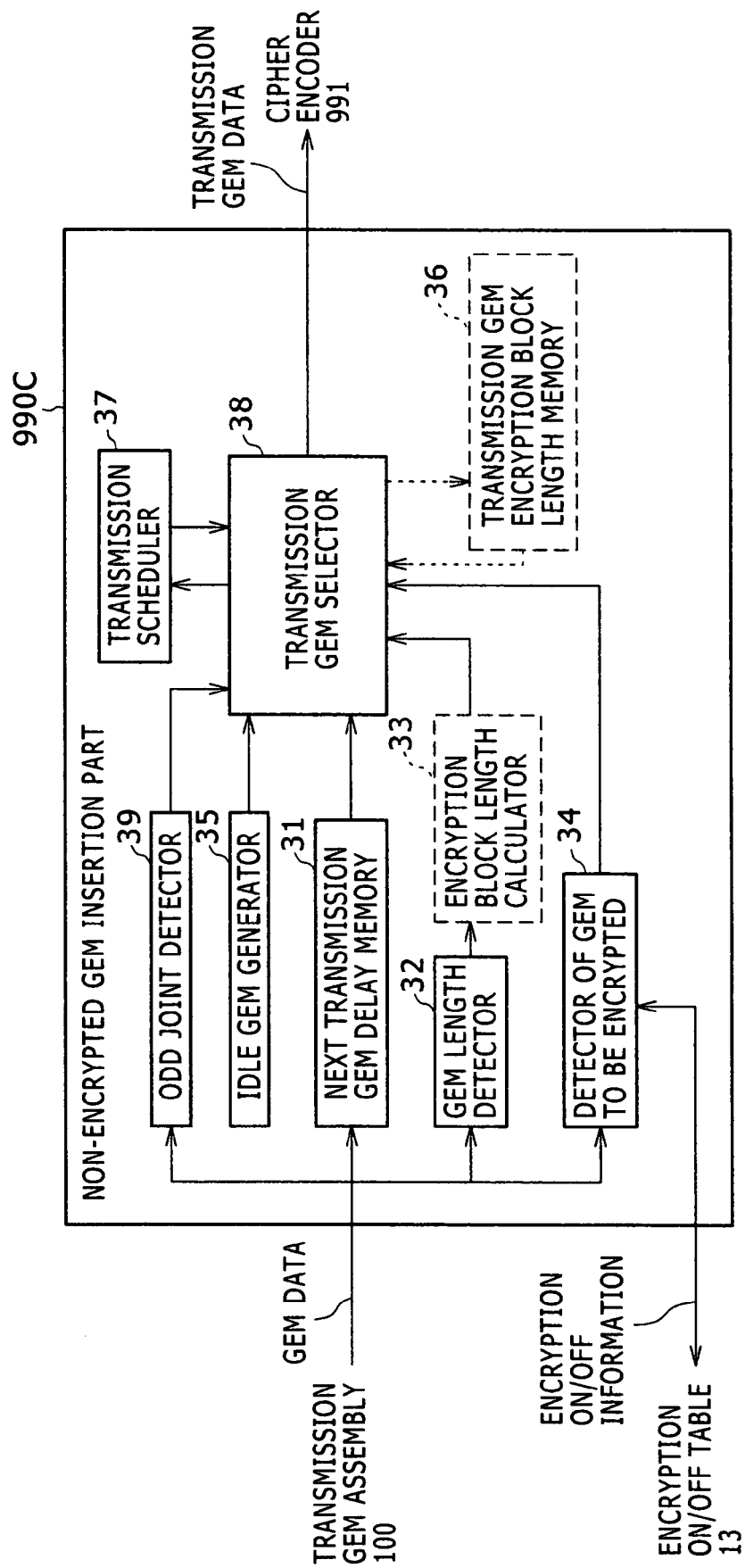
FIG. 11 is a block diagram of anon-encrypted GEM insertion part with an odd joint detector.

Referring to FIGS. 9 through 11, non-encrypted GEM insertion parts are described. Here, FIG. 9 is a block diagram of a non-encrypted GEM insertion part that determines whether to insert idle GEM data based on GEM length. FIG. 10 is a block diagram of a non-encrypted GEM insertion part that determines whether to insert idle GEM data based on an encryption block integration value. FIG. 11 is a block diagram of a non-encrypted GEM insertion part with an odd joint detector.

In FIG. 9, the non-encrypted GEM insertion part 990A receives GEM data from the transmission GEM assembly 100 and delivers transmission GEM data to the cipher encoder. The non-encrypted GEM insertion part 990A is composed of a next transmission GEM delay memory 31 which receives GEM data, a GEM length detector 32, a detector 34 of GEM to be encrypted, a transmission GEM selector 38, an idle GEM generator 35, and a transmission scheduler 37.

The non-encrypted GEM insertion part 990A determines for each GEM whether to insert idle GEM padding into the GEM and performs insertion. The non-encrypted GEM insertion part 990A uses GEM length to make this determination.

Encryption key change and encryption ON/OFF switching may occur per GEM, but does not occur per encryption block within a GEM.

The next transmission GEM delay memory 31 buffers received GEM data for a wait until the GEM data is actually output after determined by the transmission GEM selector. The next transmission GEM delay memory 31 buffers and outputs GEM data in sequence of arrival. The buffering time (a delay time from input to output) of the next transmission GEM delay memory 31 is not constant and dynamically changes depending on what number of pieces of idle GEM padding has been inserted and an accumulation of time during which no GEM data has been received. Therefore, the next transmission GEM delay memory 31 has a memory capacity that is large enough not to overflow within a certain extent of dynamic change.

The GEM length detector 32 detects the length of a received GEM (length from the beginning of the GEM header to the tail end of the GEM payload) and passes the GEM length to the transmission GEM selector 38. This detection can be done in several ways below:
- GEM length is derived from a PLI field in the GEM header of received GEM data.
- The non-encrypted GEM insertion part 990 is notified of the length of an assembled GEM from the transmission GEM assembly 100, together with the GEM data.
- The non-encrypted GEM insertion part 990 is notified of the length of an assembled GEM beforehand from the transmission GEM assembly 100, before receiving the GEM data. In this case, the next transmission GEM delay memory 31 is dispensed with.

The detector 34 of GEM to be encrypted refers to the encryption ON/OFF table, based on Port-ID specified in the header of received GEM data, and determines whether the GEM is to be encrypted in the same way as done by the encryption determiner in the cipher encoder at the following stage. The result of the determination (encryption flag information) is passed to the transmission GEM selector.

The idle GEM generator 35 generates idle GEM data including a fixed pattern of five bytes. It may always generate 40 bits of idle GEM data and pass all the bits to the transmission GEM selector at the same time (in parallel) or generate idle GEM data, when requested from the transmission GEM selector. In either case, time taken to generate idle GEM data is ignorable because of fixed pattern data.

The transmission scheduler 37 maintains a transmission schedule for received GEM data and idle GEM as determined by the transmission GEM selector. The scheduler maintains such a form of schedule that no idle GEM or n pieces of idle GEM is inserted after n-th received GEM data buffered in the next transmission GEM delay memory.

The transmission GEM selector 38 determines whether to insert idle GEM padding after received GEM data from the received GEM length obtained from the GEM length detector 32. If determining to insert padding, the transmission GEM selector inserts idle GEM data generated by the idle GEM generator directly following the GEM data which has been read from the next transmission GEM delay memory 31 and output.

Timing at which the transmission GEM selector 38 actually transmits GEM is after the completion of transmission of the preceding GEM (including padded idle GEM). This timing may be rather later than the determined timing, depending on a so-far accumulated amount of padding data. During this interval, the GEM data sequence just to be transmitted is buffered in the next transmission GEM delay memory 31. The transmission GEM selector 38 holds information that n pieces of idle GEM padding are to be inserted after GEM numbered n.

In FIG. 10, the non-encrypted GEM insertion part 990B is configured by adding an encryption block length calculator 33 and a transmission GEM encryption block length memory 36 to the non-encrypted GEM insertion part 990A shown in FIG. 9.

The non-encrypted GEM insertion part 990B determines for each GEM whether to insert idle GEM padding into the GEM and performs insertion. The non-encrypted GEM insertion part 990B uses an integration value of units of encryption blocks to make this determination. Encryption key change and encryption ON/OFF switching may occur per GEM, but does not occur per encryption block within a GEM.

The next transmission GEM delay memory 31 buffers received GEM data for a wait until the GEM data is actually output after determined by the transmission GEM selector. The next transmission GEM delay memory 31 buffers and outputs GEM data in sequence of arrival. The buffering time (a delay time from input to output) of the next transmission GEM delay memory 31 is not constant and dynamically changes depending on what number of pieces of idle GEM padding has been inserted and an accumulation of time during which no GEM data has been received. Therefore, the next transmission GEM delay memory 31 has a memory capacity that is large enough not to overflow within a certain extent of dynamic change.

The next transmission GEM delay memory 31 outputs one unit of GEM upon a read request from the transmission GM generator 38.

The GEM length detector 32 detects the length of a received GEM (length from the beginning of the GEM header to the tail end of the GEM payload) and passes the GEM length to the encryption block length calculator 33. The length of a received GEM can be detected in several ways below:
- GEM length is derived from a PLI field in the GEM header of received GEM data.
- The non-encrypted GEM insertion part is notified of the length of an assembled GEM from the transmission GEM assembly 100, together with the GEM data.
- The non-encrypted GEM insertion part 990 is notified of the length of an assembled GEM beforehand from the transmission GEM assembly 100, before receiving the GEM data. In this case, the next transmission GEM delay memory 31 is dispensed with.

The encryption block length calculator 33 calculates the lengths of encryption blocks formed in the GEM from the GEM length received from the GEM length detector 32 and passes the block lengths to the transmission GEM selector 38.

The encryption blocks are formed by dividing the GEM payload by 16 bytes, as will be described later using FIGS. 17 through 20, and the length of each block is normally 16 bytes. However, since GEM length is variable, the length of the last encryption block in one GEM may be any value from one byte to 16 bytes.

The detector 34 of GEM to be encrypted refers to the encryption ON/OFF table 13, based on Port-ID specified in the header of received GEM data, and determines whether the GEM is to be encrypted in the same way as done by the encryption determiner 11 in the cipher encoder 991 at the following stage. The detector 34 of GEM to be encrypted passes the result of the determination (encryption flag information) to the transmission GEM selector 38.

The idle GEM generator 35 generates idle GEM data including a fixed pattern of five bytes. It may always generate 40 bits of idle GEM data and pass all the bits to the transmission GEM selector at the same time (in parallel) or generate idle GEM data, when requested from the transmission GEM selector. In either case, time taken to generate idle GEM data is ignorable because of fixed pattern data.

The transmission GEM encryption block length memory 36 receives from the transmission GEM selector and retains the lengths and their total sum Σ of current Q pieces of encryption blocks including the last encryption block in the current GEM to be encrypted as determined to be transmitted by the transmission GEM selector 38. The transmission GEM encryption block length memory 36 passes those values held in it to the GEM selector 38.

The transmission scheduler 37 maintains a transmission schedule for received GEM data and idle GEM as determined by the transmission GEM selector 38. The scheduler maintains such a form of schedule that no idle GEM or n pieces of idle GEM is inserted after n-th received GEM data buffered in the next transmission GEM delay memory.

The transmission GEM selector 38 delivers received GEM data and idle GEM according to the transmission schedule information from the transmission scheduler. For received GEM data, the transmission GEM selector 38 reads and outputs the GEM data from the next transmission GEM delay memory. For idle GEM, the transmission GEM selector 38 outputs idle GEM data generated by the idle GEM generator.

When reading GEM data, the transmission GEM selector 38 issues a read request to the next transmission GEM delay memory 31 and reads one unit of GEM.

The transmission GEM selector 38 determines whether to deliver received GEM data as it is or insert idle GEM from the lengths of the encryption blocks formed in the received GEM, obtained from the encryption block length calculator 33, and the total sum Σ of the lengths L1 to LQ of previous Q pieces (Q will be defined later) of encryption blocks and gemh interleaved between each of L1 to LQ, obtained from the transmission GEM encryption block length memory 36.

This determination is made, inter alia, depending on whether the number of clock periods Ts from the start position of the first one of the previous Q pieces of encryption blocks up to the first encryption block S of received GEM data equals to or more than the predetermined value of P. Here, Ts is the addition of Σ and gemh. gemh is the number of clock periods required to receive a GEM header.

The transmission GEM selector 38 passes the result of the determination to the transmission scheduler and updates and stores the transmission schedule information.

With regard to the current GEM determined to be transmitted, the transmission GEM selector 38 calculates the total sum Σ of the lengths L1 to LQ of current Q pieces of encryption blocks including the last encryption block of the GEM and gemh interleaved between each of L1 to LQ and passes it to the transmission GEM encryption block length memory 36.

If the current GEM has a few number of encryption blocks such as one block, the above calculation may be executed for encryption blocks in the current GEM and the previous one GEM, further, the previous few GEMs such as the previous two GEMs.

The GEM newly determined to be transmitted is the one to be non-encrypted or idle GEM, the transmission GEM selector 38 updates the total sum Σ of current Q pieces of encryption blocks by adding the length Lgem of the new GEM or gemh to the block length LQ of the last one of and the total sum Σ of the previous Q pieces of encryption blocks and passes the updated Σ to the transmission encryption block length memory 36.

Q in the above description is as follows:

If the cipher encoder 991 uses one plane of a cryptographic calculator 15; Q=1.

If the cipher encoder 991 uses two planes of cryptographic calculators 15; Q=2, as exemplified in FIG. 8.

If the cipher encoder 991 uses three planes of cryptographic calculators 15; Q=3.

In FIG. 11, the non-encrypted GEM insertion part 990C is configured by adding an odd joint detector 39 to the non-encrypted GEM insertion part 990A shown in FIG. 9 or the non-encrypted GEM insertion part 990B shown in FIG. 10. Hence, the encryption block length calculator 33 and the transmission GEM encryption block length memory 36 which are not common between the non-encrypted GEM insertion part 990A and the non-encrypted GEM insertion part 990B are enclosed in dotted blocks.

To keep joints between GEMs generated by a 16-bit parallel circuit constant, the non-encrypted GEM insertion part 990C corrects the joints by padding with idle GEM. Concretely, the non-encrypted GEM insertion part 990C takes advantage of an odd length of an idle GEM pattern that is five bytes.

Figure 19:
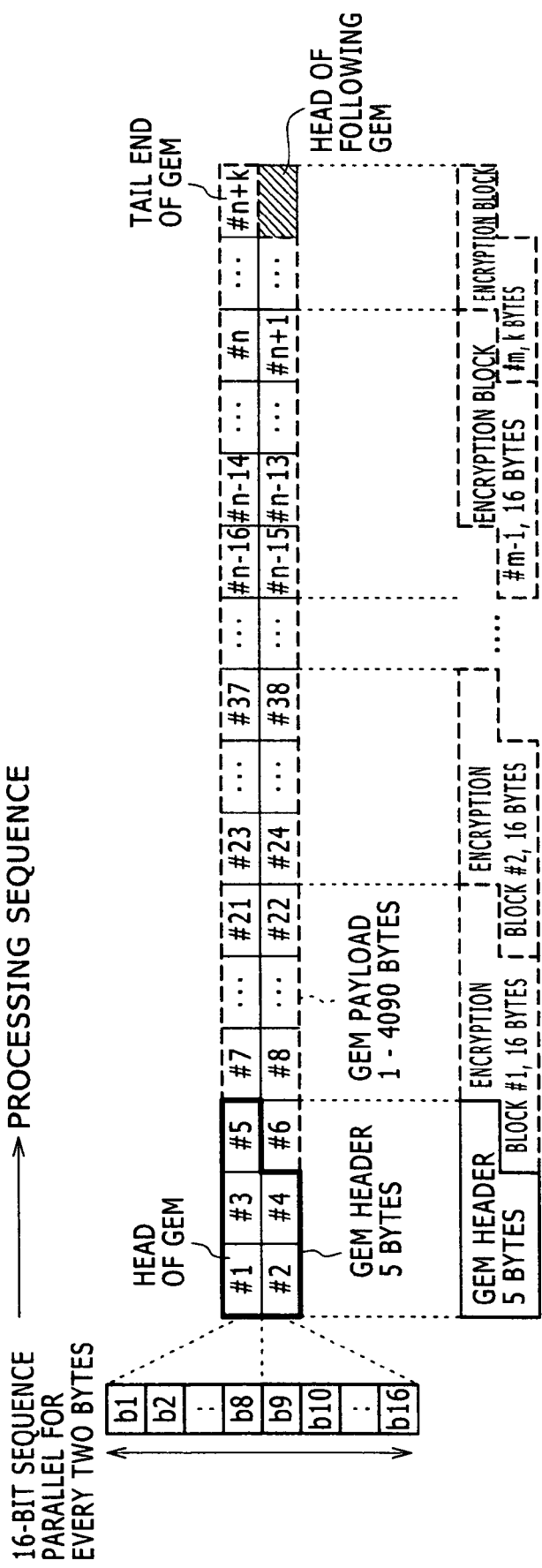
FIG. 19 illustrates a GEM format and encryption blocks, when a 16-bit sequence parallel for each two bytes is applied, the head of the GEM begins with the upper byte position, and the GEM length is odd.
Figure 20:
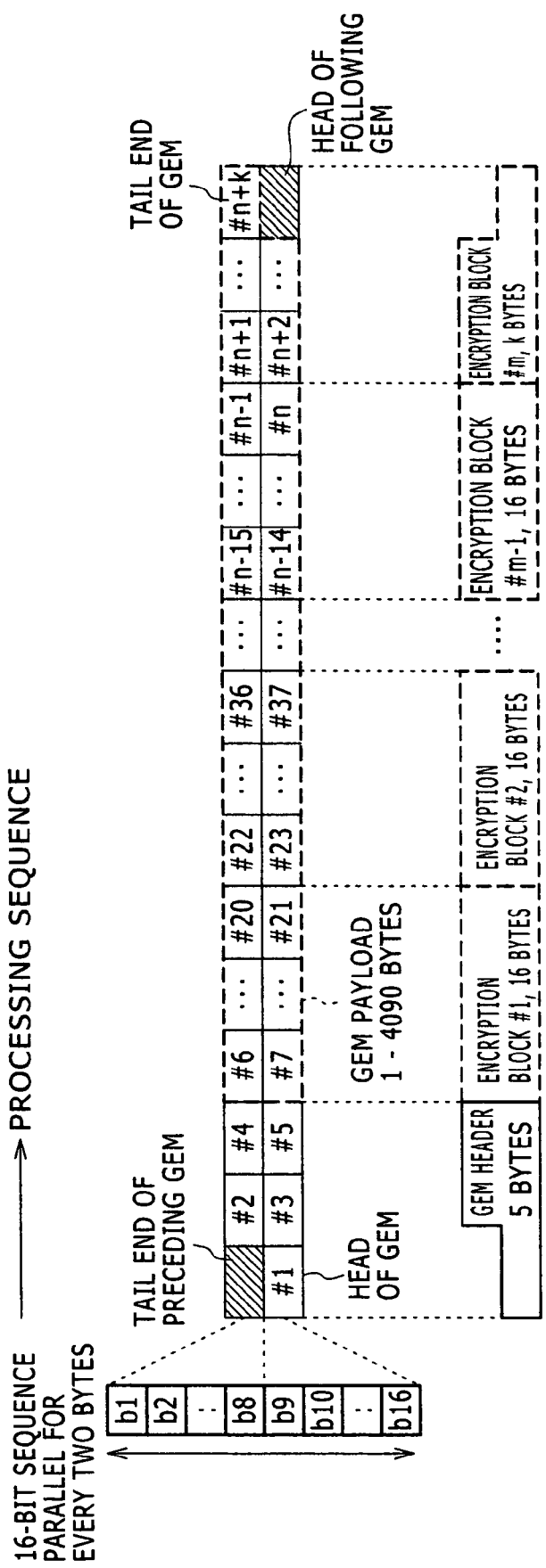
FIG. 20 illustrates a GEM format and encryption blocks, when a 16-bit sequence parallel for each two bytes is applied, the head of the GEM begins with the lower byte position, and the GEM length is even.

In the case where the non-encrypted GEM insertion part 990 and the cipher encoder 991 are constructed with 16-bit parallel circuits, an encryption block and a GEM header have odd joints as is shown in FIGS. 19 and 20, which will be described later. Because GEM length is variable, the joint formation dynamically changes; in some GEMs, the head of the GEM begins with an upper byte position, whereas, in other GEMs, the head of the GEM begins with a lower byte position.

The entire circuit is enlarged if design considerations are taken to make the circuit adaptive for dynamically changing joint formation. Thus, to make the joints fixed without the dynamic change of joint formation, the non-encrypted GEM insertion part 990C detects odd joints and inserts idle GEM padding to provide regular GEM joints.

Thereby, the entire circuit can be simplified with minimum design considerations for odd joints. To always align the head of a GEM with the upper byte position, as shown in FIG. 19, if the head of received GEM begins with the lower byte position, the non-encrypted GEM insertion part 990C inserts intermediate idle GEM so that the head of the received GEM begins with the upper byte position.

Conversely, to always align the head of a GEM with the lower byte position, as shown in FIG. 20, if the head of received GEM begins with the upper byte position, the non-encrypted GEM insertion part 990C inserts intermediate idle GEM so that the head of the received GEM begins with the lower byte position.

The odd joint detector 39 detects whether the head of received GEM begins with an odd joint, that is, whether the head begins with the lower byte position among 16 bits, and passes the result to the transmission GEM selector 38.

The transmission GEM selector 38 determines whether to insert idle GEM prior to the GEM, based on encryption flag information from the detector 34 of GEM to be encrypted and odd joint detection information from the odd joint detector 39, in addition to making the determination as in the non-encrypted GEM insertion part 990A or the non-encrypted GEM insertion part 990B, and performs insertion.

To provide regular joint formation at the head position of the received GEM to be encrypted, the non-encrypted GEM insertion part 990C determines to perform either of the following:

If the GEM is to be encrypted and an odd joint is detected at the head of the GEM, insert idle GEM prior to the GEM.

If the GEM is to be encrypted and no odd joint is detected at the head of the GEM, insert idle GEM prior to the GEM.

Alternatively, it is determined whether the GEM ends with an odd joint, that is, whether the GEM ends with the upper byte position among 16 bits, based on odd joint detection information from the odd joint detector and the GEM length from the GEM length detector and the non-encrypted GEM insertion part 990C may determine whether to insert idle GEM padding following the GEM. In this case, it does not matter whether or not the GEM is to be encrypted.

To enable the formation of the regular joint with the following received GEM to be encrypted, the non-encrypted GEM insertion part determines to perform either of the following:

If a GEM ends with an odd joint, insert idle GEM padding following the GEM. This is assumed to be done in an exemplary procedure in FIG. 35 which will be described below.

If a GEM does not end with an odd joint, insert idle GEM padding following the GEM.

This determination is made independently of the determinations described using FIGS. 9 and 10. Even if the transmission GEM selector in FIG. 10 determines not to insert idle GEM padding, but if it is determined to insert padding in this non-encrypted GEM insertion part 990C, padding is inserted; and vice versa.

Referring to FIGS. 12 through 16, the tables to which each function block refers are described. Here, FIG. 12 illustrates the encryption ON/OFF table. FIG. 13 illustrates an auxiliary table for the encryption ON/OFF table. FIG. 14 illustrates the encryption key table. FIG. 15 illustrates an auxiliary table for the encryption key table. FIG. 16 illustrates the Port-ID/ONU-ID table.

In FIG. 12, the encryption ON/OFF table 13 includes an address column and a description column. In response to a read request with a specified address, the description at the address is output. A maximum number of addresses is 4096 and it is only required that the table has as many addresses as the number of Port-IDs supported. Description indicates ON/OFF of encryption of the GEM that is assigned the port corresponding to the address. Correspondence between Port-ID and address may be fixed so that a Port-ID number equals to an address number or a Port-ID number and an address number may be set in the auxiliary table 13a shown in FIG. 13.

In FIG. 13, the auxiliary table 13a for the encryption ON/OFF table includes an address column and a description column. In response to a read request with a specified address, the description at the address is output. A maximum number of addresses is 4096 and it is only required that the table has as many addresses as the number of Port-IDs supported. Description indicates the address in the encryption ON/OFF table corresponding to the address (Port-ID).

In FIG. 14, the encryption key table 19 includes an address column and a description column. In response to a read request with a specified address, the description at the address is output. A maximum number of addresses is 64 and it is only required that the table has as many addresses as the number of ONU-IDs supported. Description indicates the encryption key of the ONU corresponding to the address. Correspondence between ONU-ID and address may be fixed so that a ONU-ID number equals to an address number or a ONU-ID number and an address number may be set in the auxiliary table 19a shown in FIG. 15.

In FIG. 15, the auxiliary table 19a for the encryption key table includes an address column and a description column. In response to a read request with a specified address, the description at the address is output. A maximum number of addresses is 64 and it is only required that the table has as many addresses as the number of ONU-IDs supported. Description indicates the address in the encryption key table corresponding to the address (ONU-ID).

In FIG. 16, the Port-ID/ONU-ID table 25 includes an address column and a description column. In response to a read request with a specified address, the description at the address is output. A maximum number of addresses is 4096 and it is only required that the table has as many addresses as the number of Port-IDs supported. Description indicates the ONU-ID of the ONT 2 to which GEM is transmitted, having the Port ID corresponding to the address. However, as for a GEM having a Port-ID for multicasting to two or more ONTs 2 simultaneously, description indicating multicast (for example, all "1s") instead of ONU-ID is stored. There may be plural Port-IDs for multicasting.

Figure 17:
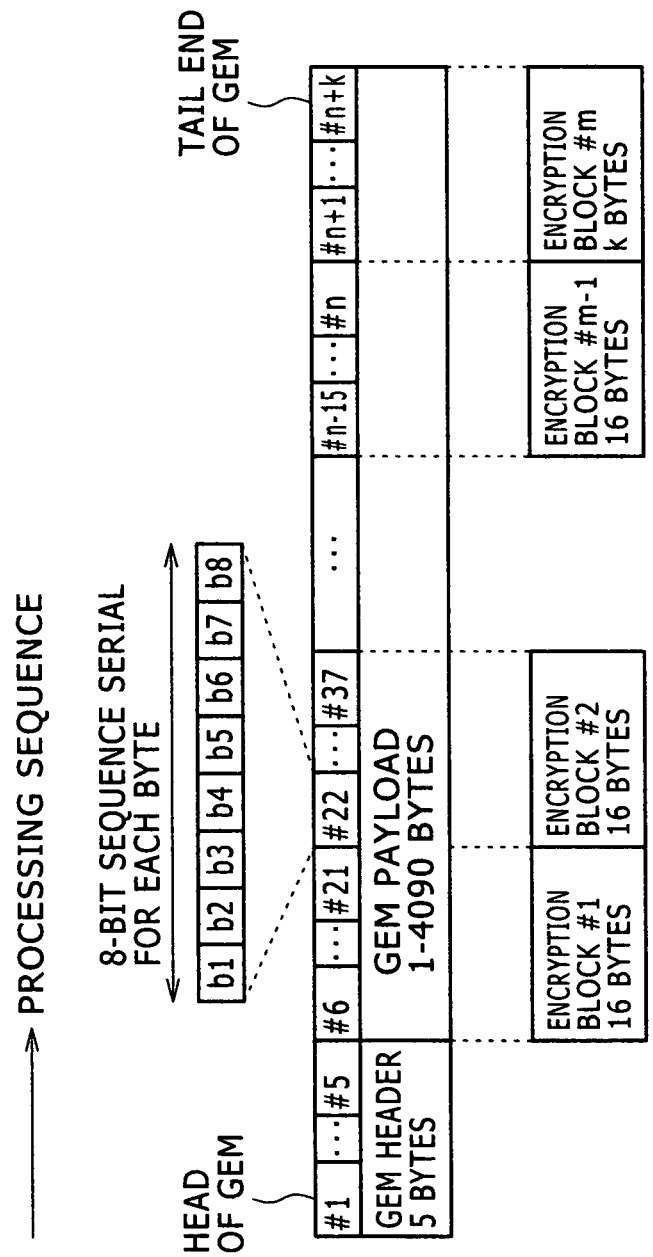
FIG. 17 illustrates a GEM format and encryption blocks, when an 8-bit sequence serial for each byte is applied.
Figure 18:
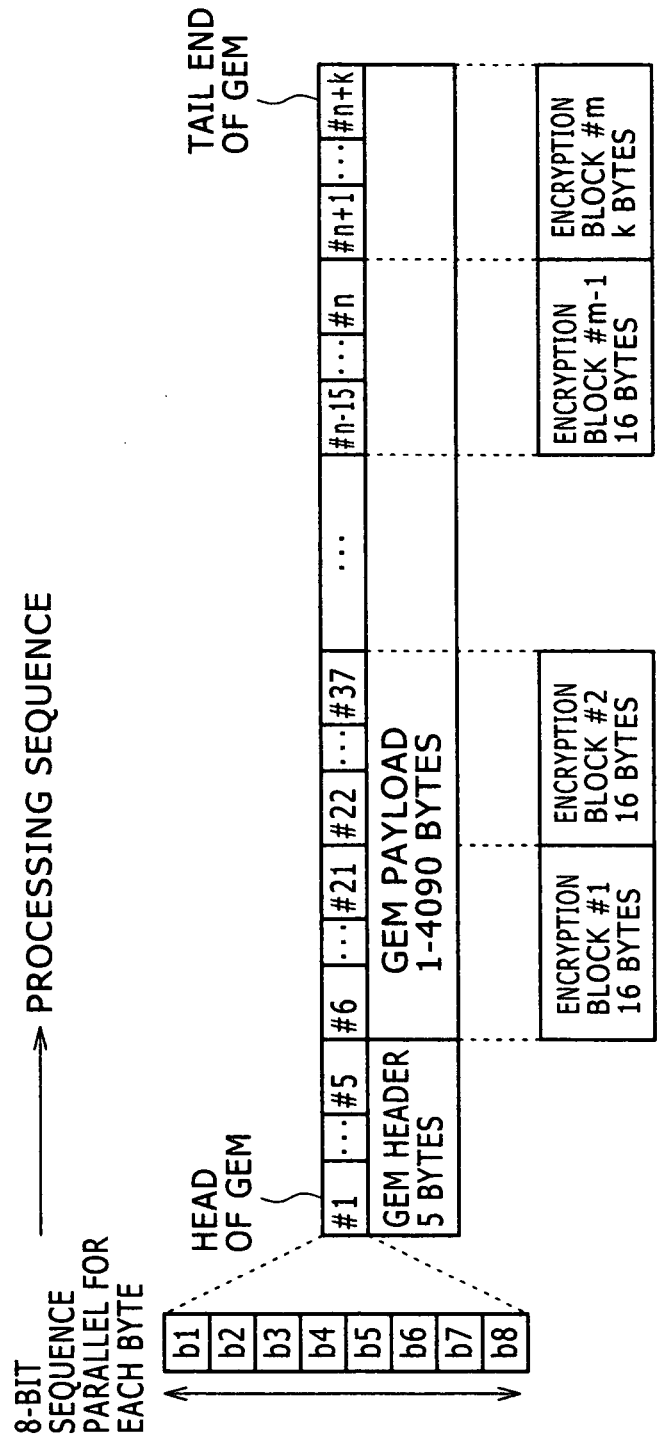
FIG. 18 illustrates a GEM format and encryption blocks, when an 8-bit sequence parallel for each byte is applied.

Referring to FIGS. 17 through 20, GEM formats and signal flows are described. Here, FIG. 17 illustrates a GEM format and encryption blocks, when an 8-bit sequence serial for each byte is applied. FIG. 18 illustrates a GEM format and encryption blocks, when an 8-bit sequence parallel for each byte is applied. FIG. 19 illustrates a GEM format and encryption blocks, when a 16-bit sequence parallel for each two bytes is applied, the head of the GEM begins with the upper byte position, and the GEM length is odd. FIG. 20 illustrates a GEM format and encryption blocks, when a 16-bit sequence parallel for each two bytes is applied, the head of the GEM begins with the lower byte position, and the GEM length is even.

In FIG. 17, a GEM includes a GEM header which is five bytes long from the head of the GEM and a GEM payload which is 1 to 4090 bytes long following the GEM header. An encryption block is 16 bytes long and encryption blocks #1 to #m−1 are 16 bytes long, but the last encryption block #m is k ($1 \leq k \leq 16$) bytes long.

The GEM format shown in FIG. 18 only differs from the GEM format shown in FIG. 17 in that parallel data is applied instead of serial data.

In FIG. 19, because the head of the GEM begins with the upper byte position, the GEM header with a fixed length of five bytes ends with the upper byte position. Ending with the upper byte position or beginning with the lower byte position is referred to as an odd joint herein. Also, because the GEM length is odd, the GEM tail ends with the upper byte position and makes an odd joint. Encryption blocks #1 to #m all have odd joints. At the GEM tail end timing, the head of the following GEM occupies the lower byte position.

In FIG. 20, the head of the GEM begins with the lower byte position and the GEM header has an odd joint. Because the GEM length is even, the encryption block #m makes an odd joint. The upper byte position at the head of the GEM is occupied by the tail end of the preceding GEM.

Figure 21:
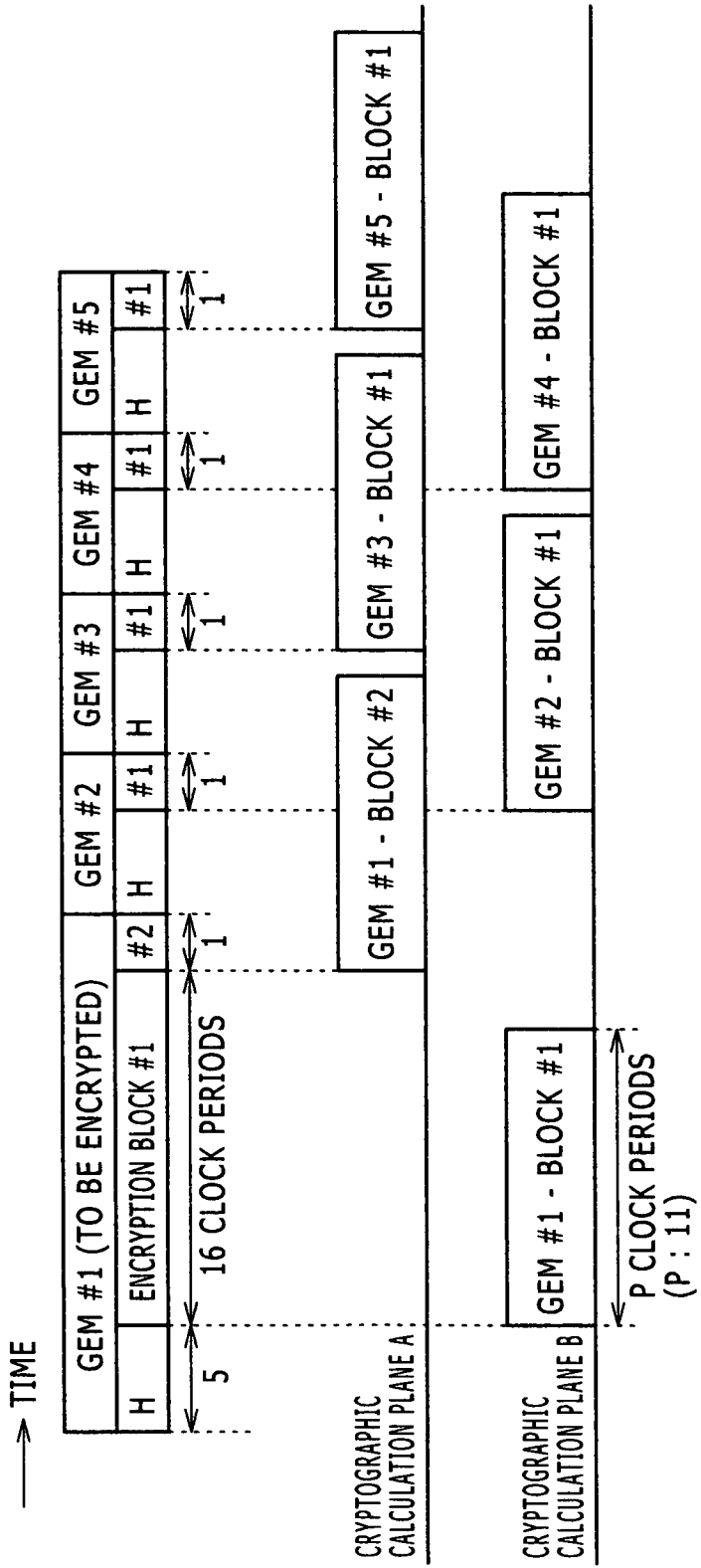
FIG. 21 illustrates the number of planes required for AES-128 cryptographic calculation planes with 8-bit parallel circuits.
Figure 22:
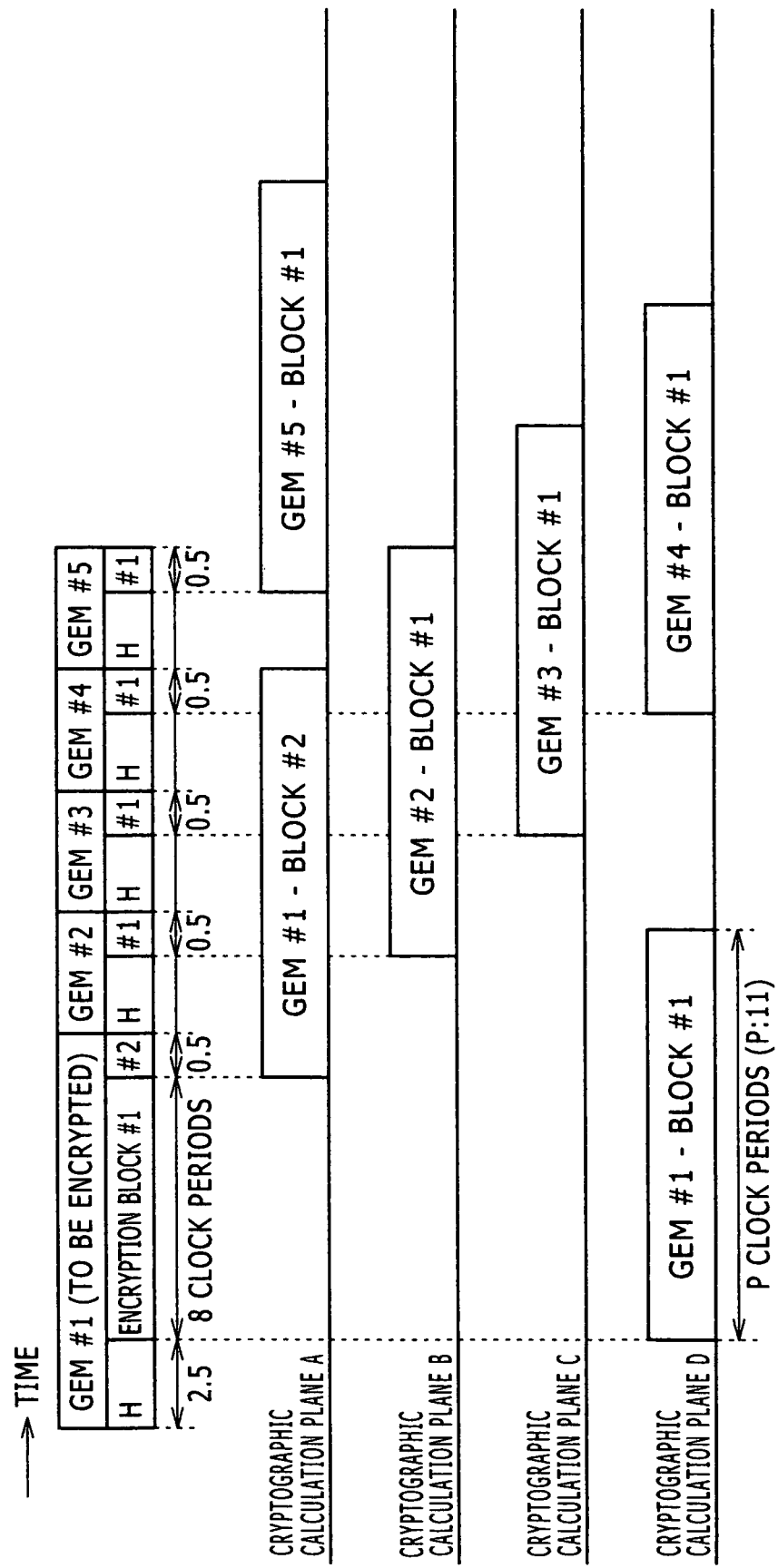
FIG. 22 illustrates the number of planes required for AES-128 cryptographic calculation planes with 16-bit parallel circuits.

Referring to FIGS. 21 and 22, the number of planes required for cryptographic calculation planes is described. Here, FIG. 21 illustrates the number of planes required for AES-128 cryptographic calculation planes with 8-bit parallel circuits. FIG. 22 illustrates the number of planes required for AES-128 cryptographic calculation planes with 16-bit parallel circuits.

In FIG. 21, since AES-128 requires 10 rounds of calculation, one round of calculation is executed in one clock period and one clock period is required for data loading, hence, P=11. GEM#1 to be encrypted includes a 5-byte header, a 16-byte encryption block #1, and a 1-byte encryption block #2. Each of GEM#2 through GEM#5 includes a 5-byte header and a 1-byte encryption block #1. Here, because the 8-bit parallel circuits which process one byte per clock period are used, one byte is equivalent to one clock and the encryption block #1 of GEM#1 can be processed by using one cryptographic calculation plane B within 16 clock periods. However, the encryption block #2 of GEM#1 and following encryption blocks each are one byte long and, therefore, two planes are needed as the cryptographic calculation planes, taking five bytes of the header into account ((5+1)×2=12>11).

In FIG. 22, with 16-bit parallel circuits which process two bytes per clock period, one clock=two bytes. 2.5 clock periods are required to process a header and 8 clock periods to process a 16-byte encryption block (2.5+8=10.5<11) and it is obvious that one cryptographic processor is not enough to perform the cryptographic calculation task. Supposing that a series of GEMs each having an encryption block which is one byte long (0.5 clock) is processed, at least four planes are needed ((2.5+0.5)×4=12>11).

In FIGS. 21 and 22, if AES-192 (key length of 192 bits) and AES-256 (key length of 256 bits) having different key lengths from the key length of the AES-128 are used, their rounds of calculation are 12 rounds, 14 rounds, which also differ from the AES-128 case, and therefore, the number of cryptographic calculation planes differs.

Figure 23:
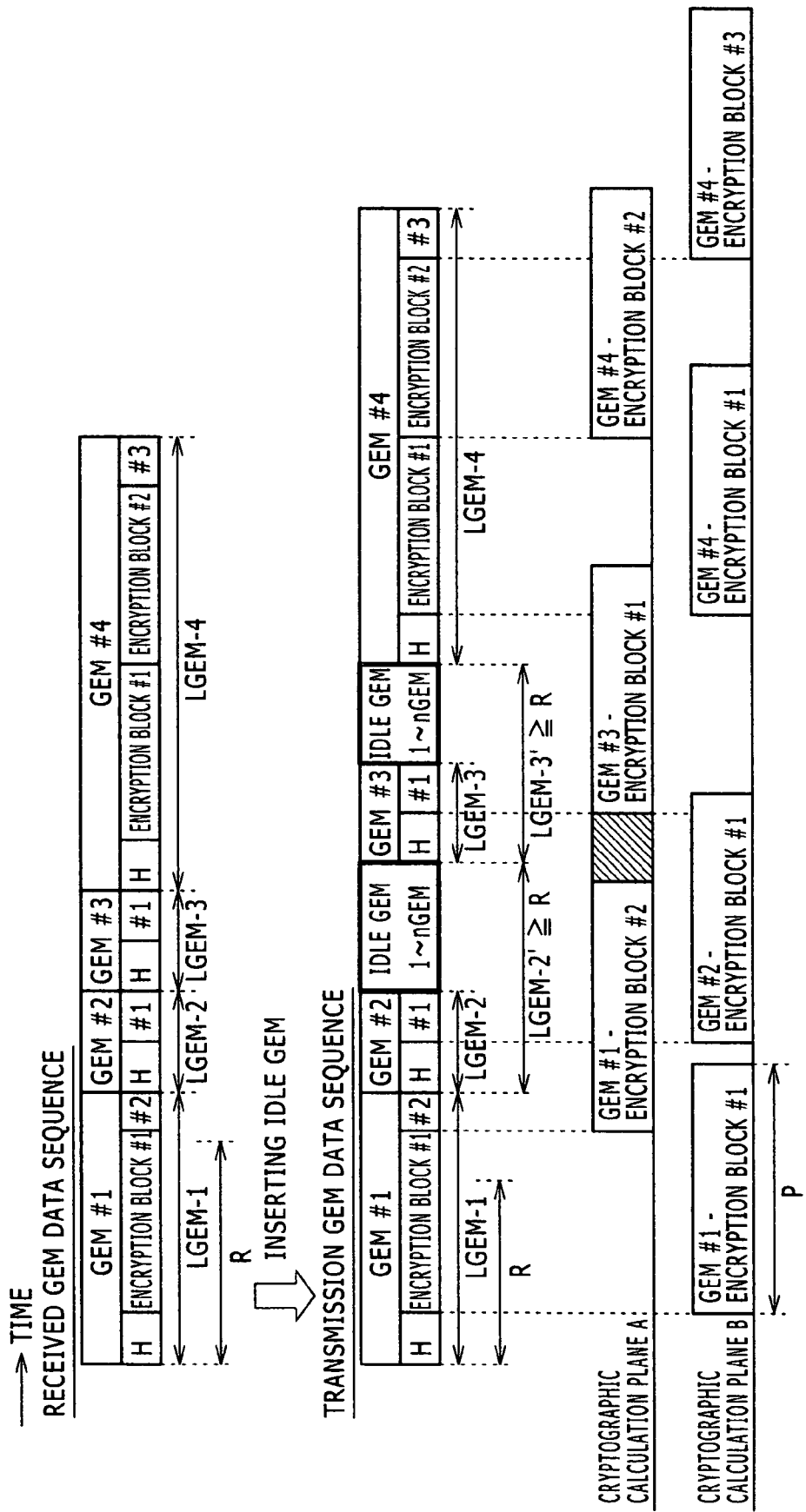
FIG. 23 illustrates allocation of encryption blocks to two planes by inserting idle GEMs based on the lengths of GEMs to be encrypted.
Figure 24:
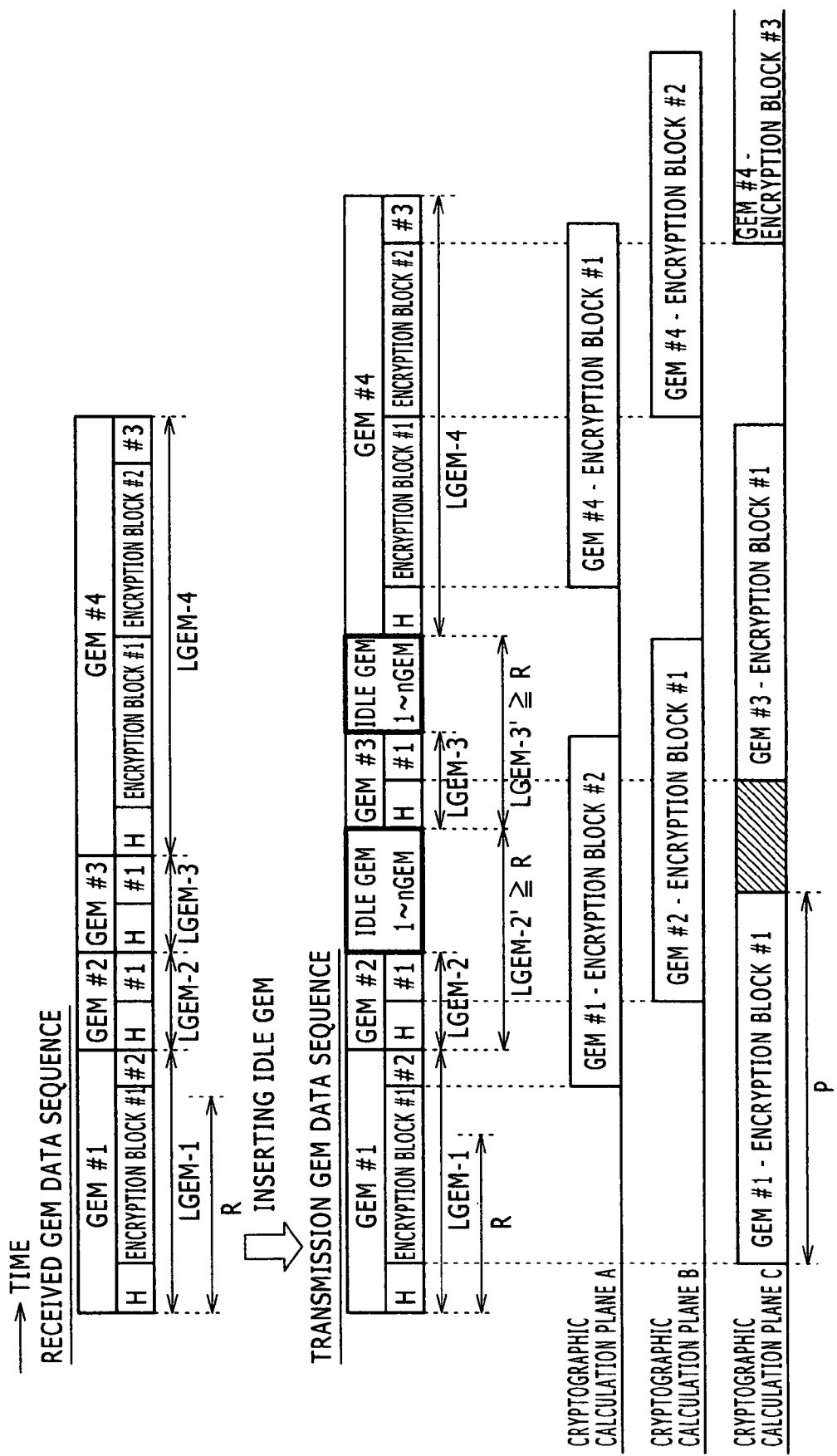
FIG. 24 illustrates allocation of encryption blocks to three planes by inserting idle GEMs based on the lengths of GEMs to be encrypted.
Figure 25:
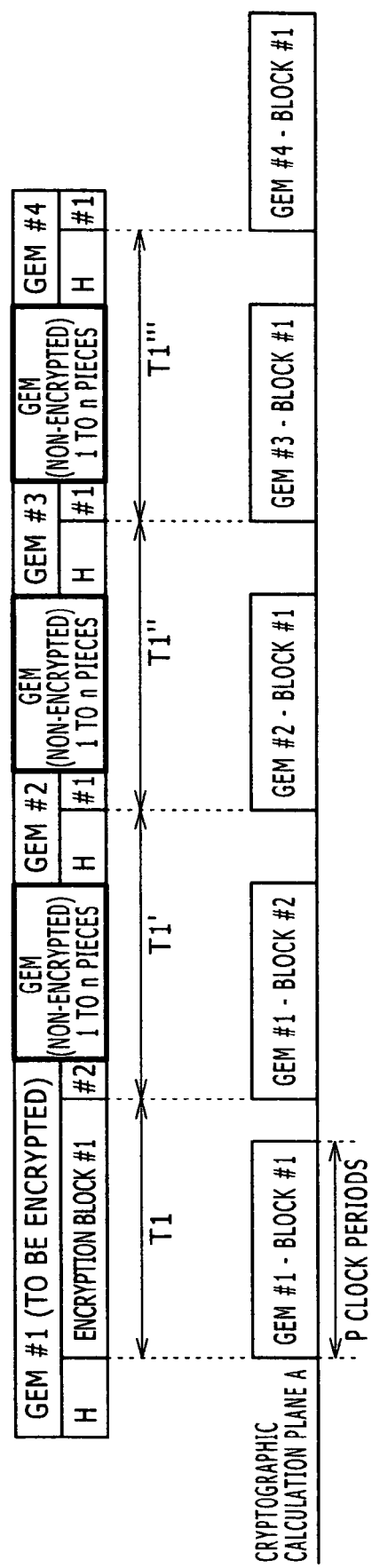
FIG. 25 illustrates allocation of encryption blocks to one plane by inserting GEMs which are non-encrypted based on encryption block integration information.
Figure 26:
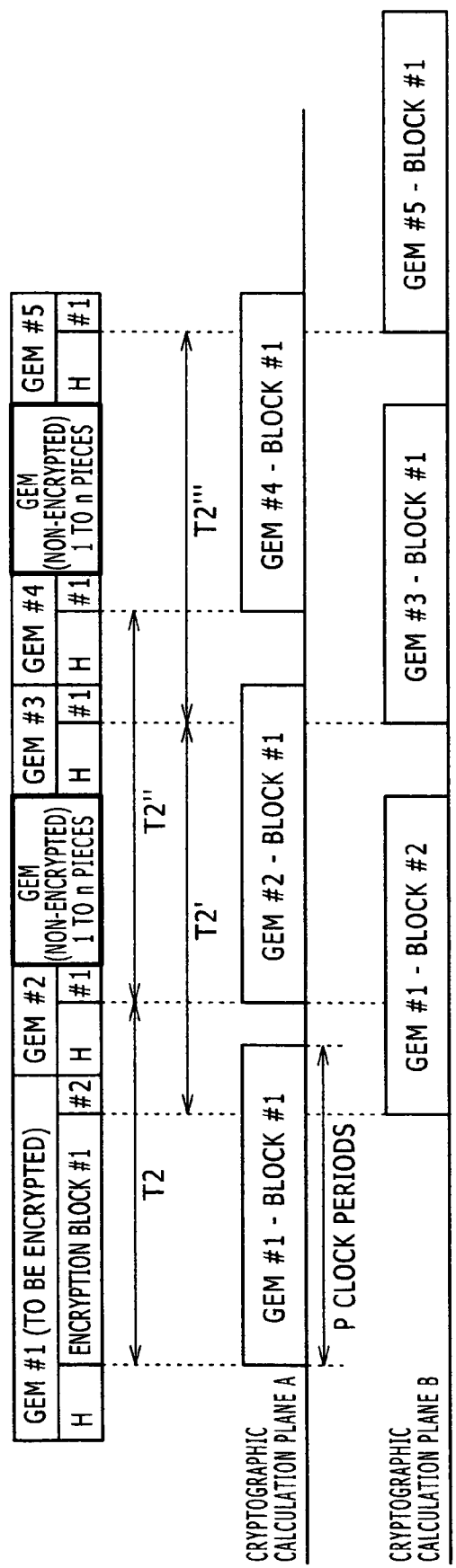
FIG. 26 illustrates allocation of encryption blocks to two planes by inserting GEMs which are non-encrypted based on encryption block integration information.
Figure 27:
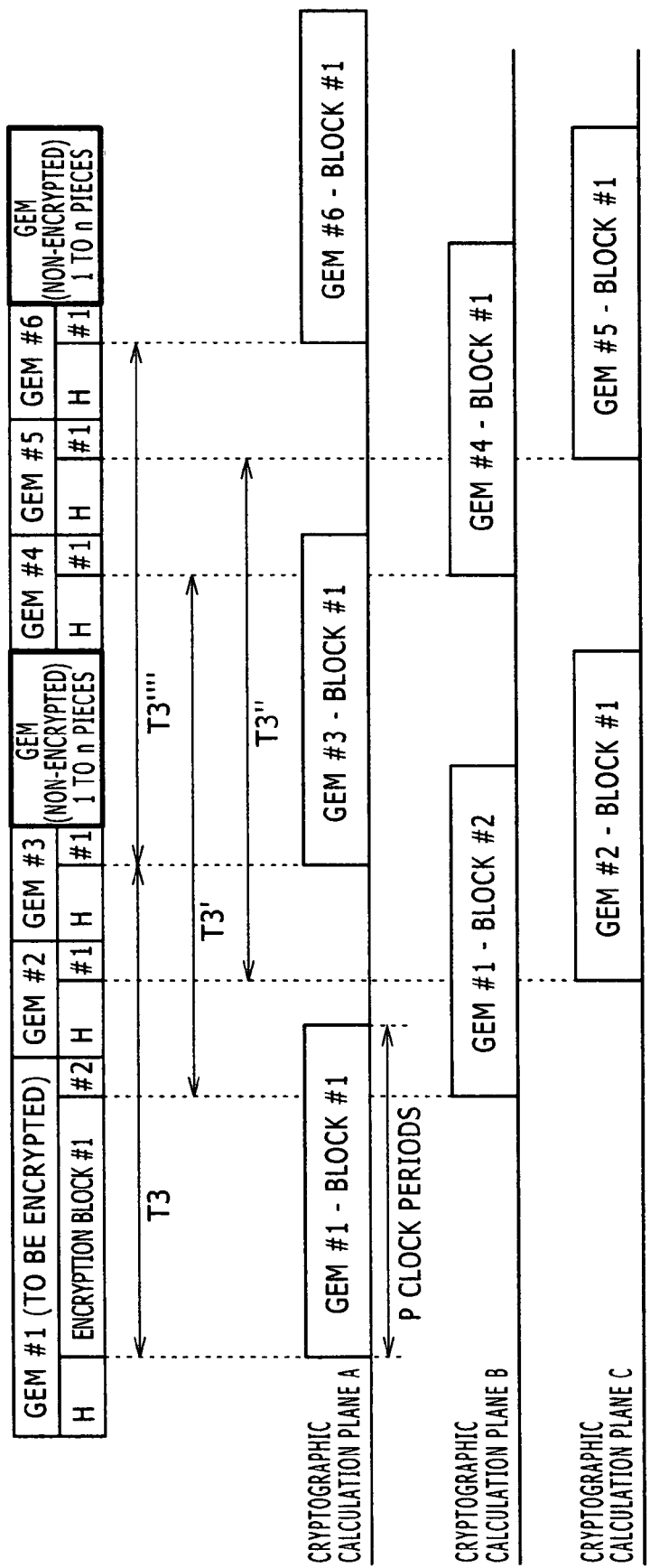
FIG. 27 illustrates allocation of encryption blocks to three planes by inserting GEMs which are non-encrypted based on encryption block integration information.

Referring to FIGS. 23 through 27, methods of reducing the cryptographic calculators are described. Here, FIG. 23 illustrates allocation of encryption blocks to two planes by inserting idle GEMs based on the lengths of GEMs to be encrypted. FIG. 24 illustrates allocation of encryption blocks to three planes by inserting idle GEMs based on the lengths of GEMs to be encrypted. FIG. 25 illustrates allocation of encryption blocks to one plane by inserting GEMs which are non-encrypted based on encryption block integration information. FIG. 26 illustrates allocation of encryption blocks to two planes by inserting GEMs which are non-encrypted based on encryption block integration information. FIG. 27 illustrates allocation of encryption blocks to three planes by inserting GEMs which are non-encrypted based on encryption block integration information.

In FIG. 23, received GEM data sequence and transmission GEM data sequence are those that are received and transmitted by the non-encrypted GEM insertion part 990 shown in FIG. 6 or FIG. 7. The non-encrypted GEM insertion part 990 inserts idle GEMs into the received GEM data sequence in order to intentionally extend short code blocks and lighten the task of cryptographic calculation.

Here, all GEMs #1 to #4 in the received GEM data sequence are to be encrypted. If the length Lgem-i (in terms of clock periods) of a GEM #i to be encrypted is less than a predetermined value R, the non-encrypted GEM insertion part 990 inserts one or more pieces of idle GEM padding between GEM #i and GEM #j so that time Lgem-i' (clock periods) before the start of the following GEM #j becomes equal to or more than the predetermined value R. In FIG. 23, because the lengths Lgem-2 and Lgem-3 of GEM#2 and GEM#3 are less than R, the non-encrypted GEM insertion part 990 inserts idle GEM padding so that time Lgem-2', Lgem-3' before the start of the following GEMs #3 and #4, respectively, becomes equal to or more than R.

For a GEM which is non-encrypted or a GEM whose length is equal to or more than R, it is not needed to insert idle GEM padding.

Here,

P: the number of clock periods required for cryptographic calculation $R$: a value satisfying $R \geq (P \div 2)$, when $P \leq 12$ a value satisfying $R \geq (P-6)$, when $P \geq 12$ In the case of 8-bit parallel circuits, the number of clock periods is equal to the number of bytes, as these circuits process one byte data for one clock period. In the case of 16-bit parallel circuits, the number of clock periods is equal to one half of the number of bytes, as these circuits process two bytes data for one clock period. If the number of bytes is odd, it is determined whether Lgem-2' and the like are equal to or more than P, after truncating the fraction part.

In the case of 8-bit parallel circuits, all Lgem-i values are 6 or more and, therefore, it is not necessary to insert idle GEM padding for a cryptographic calculation circuit with P≤12. In the case of 16-bit parallel circuits, all Lgem-i values are 3 or more and, therefore, it is not necessary to insert idle GEM padding for a cryptographic calculation circuit with P≤6.

According to this method, padding insertion between GEM#2 and GEM#3 produces an interval denoted by a shaded portion in the calculation and an overlap on the cryptographic calculation plane A can be avoided.

In FIG. 23, it is actually no problem that padding is not inserted between GEM#3 and GEM#4. This is attributed to that the determination as to whether to insert padding is made only based on GEM length.

In FIG. 24, received GEM data sequence and transmission GEM data sequence are those that are received and transmitted by the non-encrypted GEM insertion part 990 shown in FIG. 6 or FIG. 7. The non-encrypted GEM insertion part 990 inserts idle GEMs into the received GEM data sequence in order to intentionally extend short code blocks and lighten the task of cryptographic calculation.

Here, all GEMs #1 to #4 in the received GEM data sequence are to be encrypted. If the length Lgem-i (in terms of clock periods) of a GEM #i to be encrypted is less than a predetermined value R, the non-encrypted GEM insertion part 990 inserts one or more pieces of idle GEM padding between GEM #i and GEM #j so that time Lgem-i' (clock periods) before the start of the following GEM #j becomes equal to or more than the predetermined value R. In FIG. 24, because the lengths Lgem-2 and Lgem-3 of GEM#2 and GEM#3 are less than R, the non-encrypted GEM insertion part 990 inserts idle GEM padding so that time Lgem-2', Lgem-3' before the start of the following GEMs #3 and #4, respectively, becomes equal to or more than R.

For a GEM which is non-encrypted or a GEM whose length is equal to or more than R, it is not needed to insert idle GEM padding, following the GEM.

Here, $R$: $R \geq P \div 3$, when $P \leq 18$ $R \geq (P-6) \div 2$, when $P \geq 18$ In the case of 8-bit parallel circuits, the number of clock periods is equal to the number of bytes, as these circuits process one byte data for one clock period. In the case of 16-bit parallel circuits, the number of clock periods is equal to one half of the number of bytes, as these circuits process two bytes data for one clock period. If the number of bytes is odd, it is determined whether Lgem-2' and the like are equal to or more than P, after truncating the fraction part.

In the case of 8-bit parallel circuits, all Lgem-i values are 6 or more and, therefore, it is not necessary to insert idle GEM padding for a cryptographic calculation circuit with $P \leq 18$. In the case of 16-bit parallel circuits, all Lgem-i values are 3 or more and, therefore, it is not necessary to insert idle GEM padding for a cryptographic calculation circuit with $P \leq 9$.

According to this method, padding insertion between GEM#2 and GEM#3 produces an interval denoted by a shaded portion in the calculation and an overlap on the cryptographic calculation plane C can be avoided.

As is the case for FIG. 23, in FIG. 24 as well, it is actually no problem that padding is not inserted between GEM#3 and GEM#4. This is also attributed to that the determination as to whether to insert padding is made only based on GEM length.

In FIG. 25, the non-encrypted GEM insertion part 990 inserts one or more pieces of GEM which is non-encrypted so that lengths T1, T1', T1", . . . before the following encryption block become equal to more than P clock periods. In particular, it is determined for each GEM whether to insert GEM which is non-encrypted, based on the length of the preceding one encryption block. Here, the GEM which is non-encrypted is received GEM data to be non-encrypted or idle GEM. The header portion is added to the preceding encryption block.

The cipher encoder 991 following this non-encrypted GEM insertion part 990 may be configured with one plane of cryptographic calculation.

In FIG. 26, the non-encrypted GEM insertion part 990 inserts one or more pieces of GEM which is non-encrypted so that lengths T2, T2', T2", . . . before the following two encryption blocks become equal to more than P clock periods. In particular, it is determined for each GEM whether to insert GEM which is non-encrypted, based on the integration value of the lengths of the preceding two encryption blocks. The header portion is added to the preceding encryption block.

The cipher encoder 991 following this non-encrypted GEM insertion part 990 may be configured with two planes of cryptographic calculation. Because the determination is based on the integration value of the previous two encryption blocks, unnecessary padding as noted for FIGS. 23 and 24 does not take place.

In FIG. 27, the non-encrypted GEM insertion part 990 inserts one or more pieces of GEM which is non-encrypted so that lengths T3, T3', T3", . . . before the following three encryption blocks become equal to more than P clock periods. In particular, it is determined for each GEM whether to insert GEM which is non-encrypted, based on the integration value of the lengths of the preceding three encryption blocks. The header portion is added to the preceding encryption block.

The cipher encoder 991 following this non-encrypted GEM insertion part 990 may be configured with three planes of cryptographic calculation.

Figure 28:
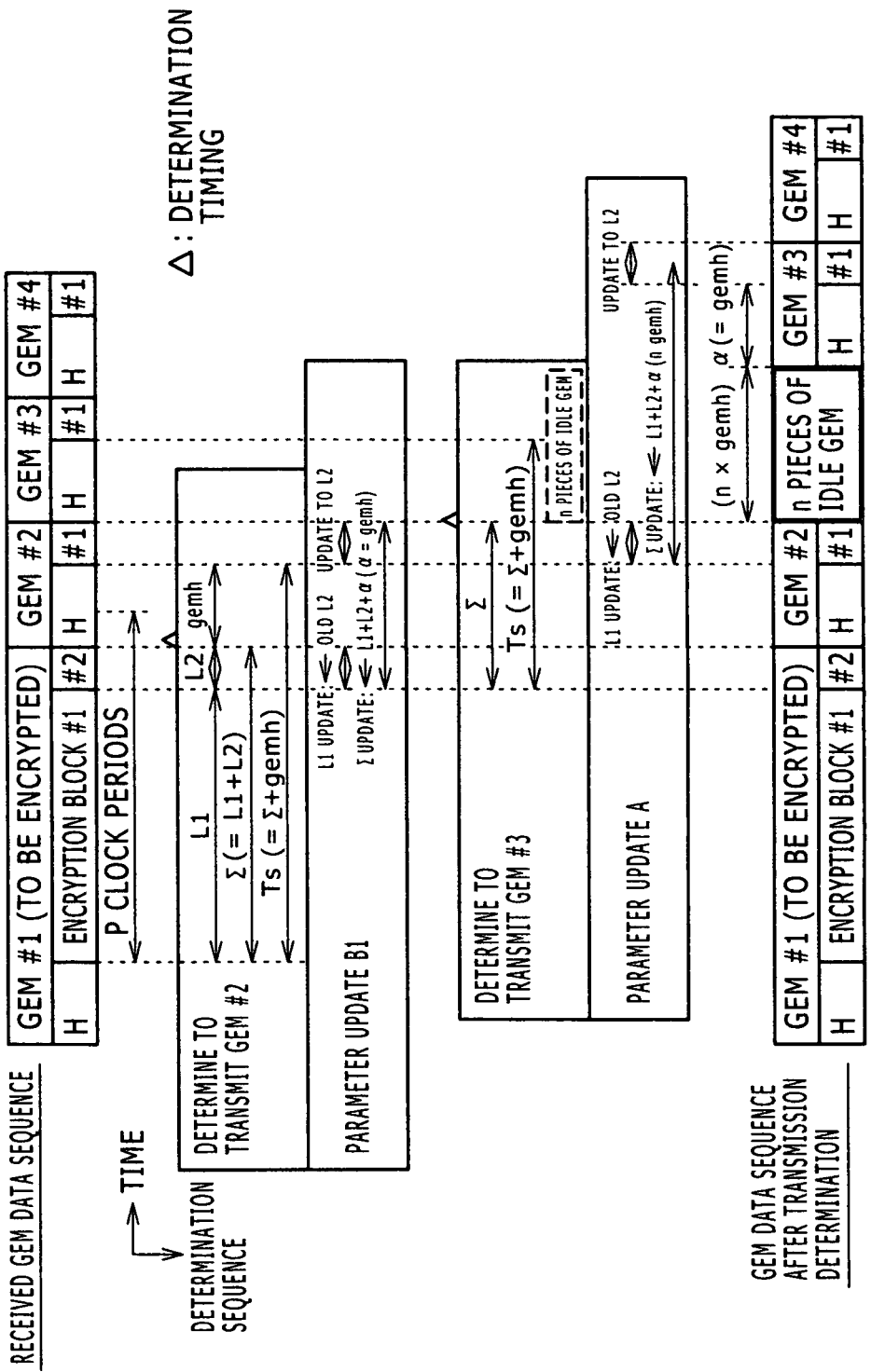
FIG. 28 illustrates operations including determining if Ts<P and inserting idle GEM.
Figure 29:
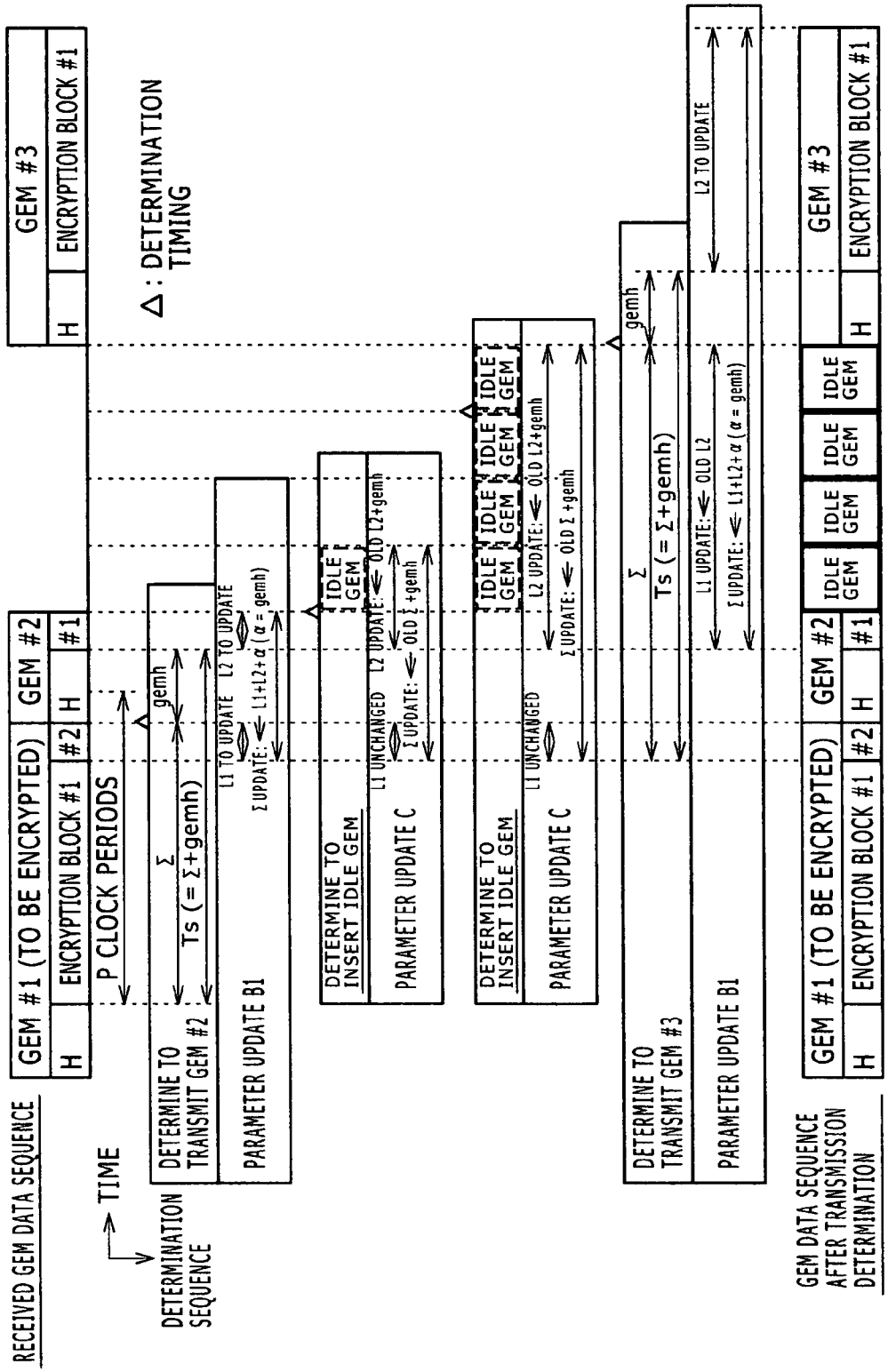
FIG. 29 illustrates operations including determining that no GEM data is received and inserting idle GEM.
Figure 30:
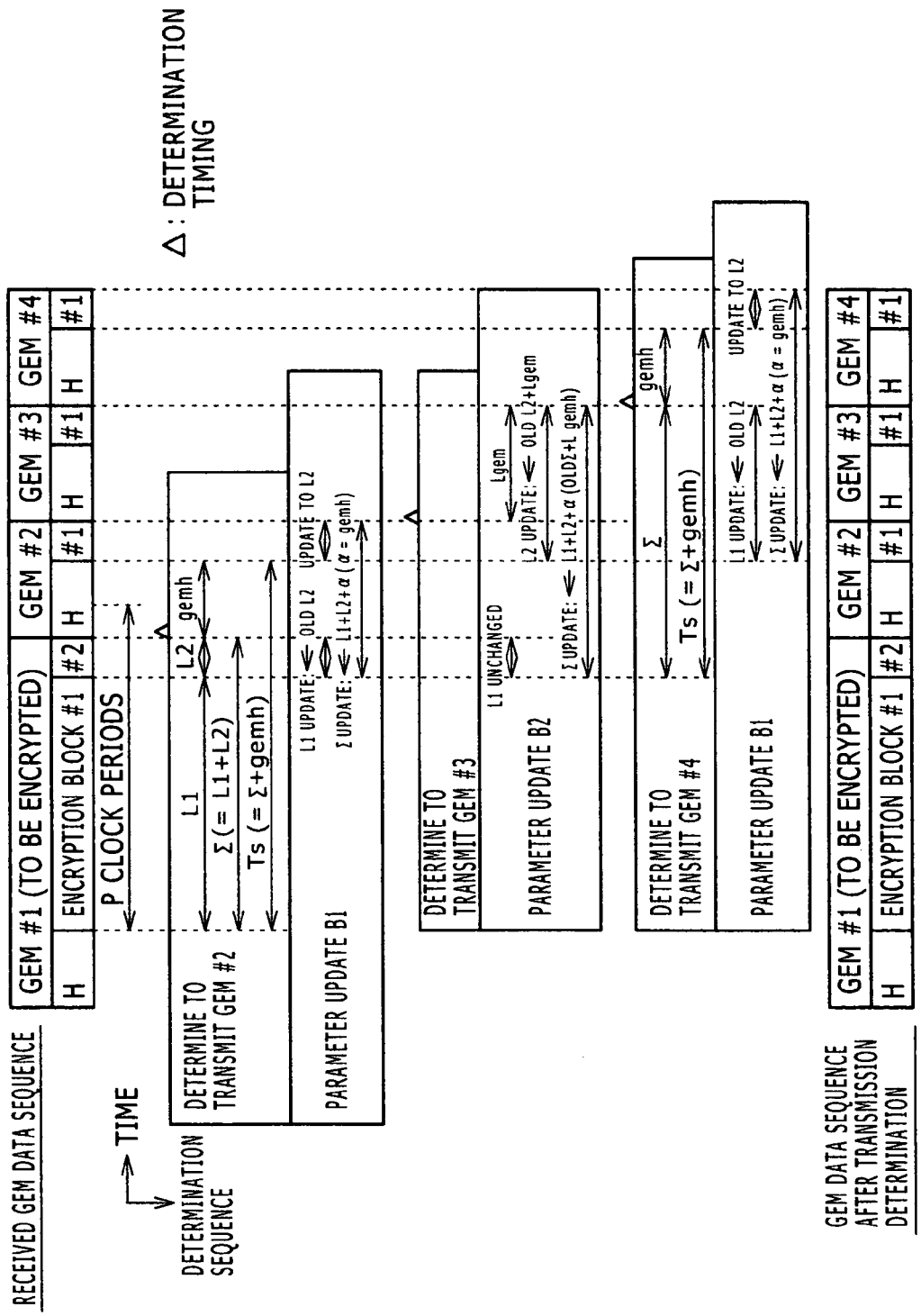
FIG. 30 illustrates operations upon determining that GEM which is non-encrypted has been received.
Figure 31:
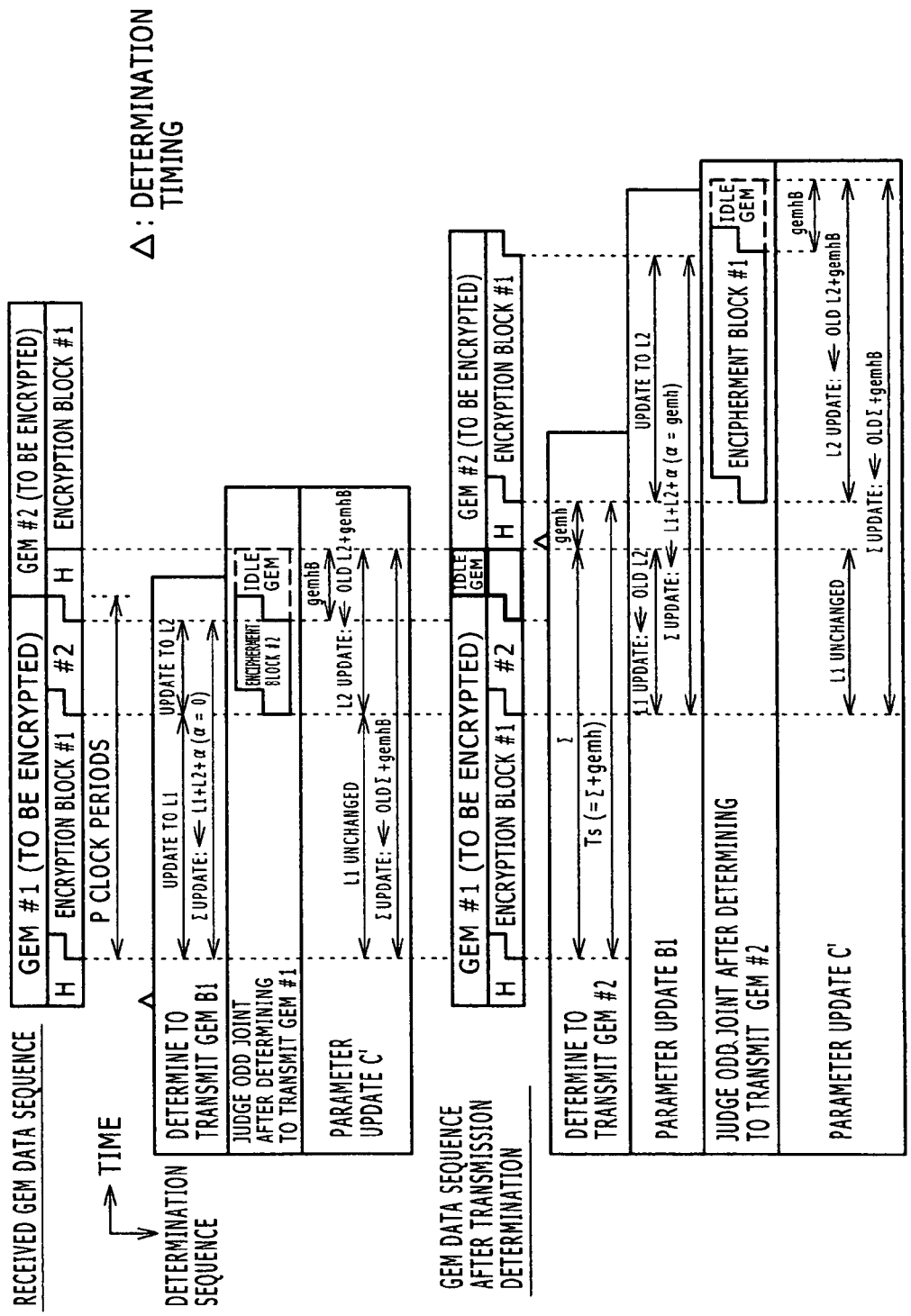
FIG. 31 illustrates operations including detecting an odd joint and inserting idle GEM.
Figure 32:
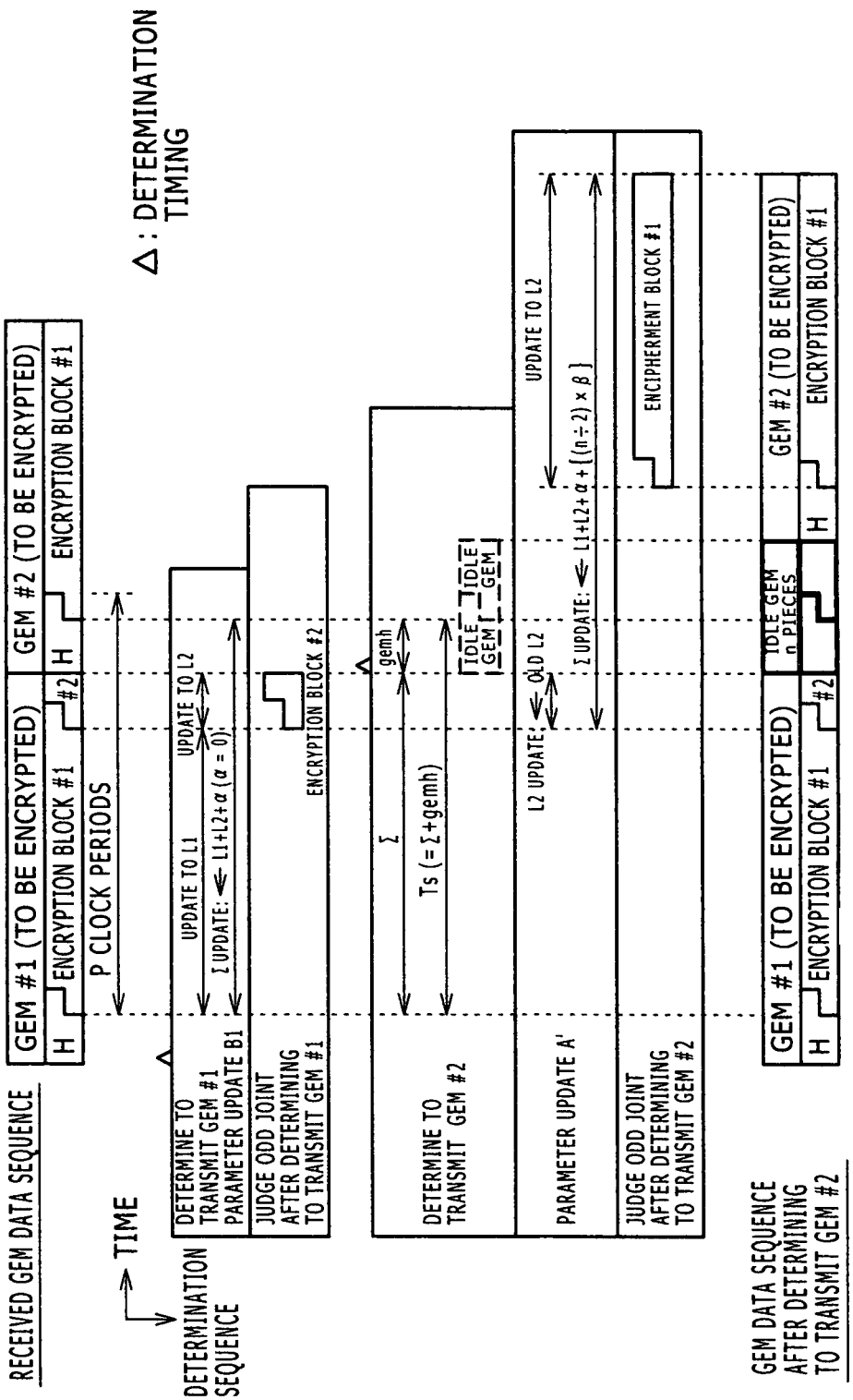
FIG. 32 illustrates operations including determining if Ts<P, taking account of an odd joint, and inserting idle GEM.

Referring to FIGS. 28 through 32, details on the determinations that are made by the transmission GEM selector are described. Here, FIG. 28 illustrates operations including determining if Ts<P and inserting idle GEM. FIG. 29 illustrates operations including determining that no GEM data is received and inserting idle GEM. FIG. 30 illustrates operations upon determining that GEM which is non-encrypted has been received. FIG. 31 illustrates operations including detecting an odd joint and inserting idle GEM. FIG. 32 illustrates operations including determining if Ts<P, taking account of an odd joint, and inserting idle GEM.

In FIG. 28, it is assumed that Q=2 (two planes of cryptographic calculators) and all GEMs #1, #2, #3, #4 in the received GEM data sequence are to be encrypted. The abscissa represents passage of time and the ordinate represents determination sequence.

The transmission GEM determiner 38 determines to transmit GEM#2 with or without padding before transmitting GEM#2. L1 is the length of an encryption block #1 in GEM#1 and L2 is the length of an encryption block #2. Because of Q=2, $\Sigma$=L1+L2 and Ts=$\Sigma$+gemh. Here, Ts$\geq$P, so the transmission GEM determiner 38 transmits GEM#2 as is to the cipher encoder 991. The transmission GEM determiner 38 then updates the parameters. This update is referred to as parameter update B1. Specifically, L1 is updated to the length of the encryption block #2 in GEM#1 (new L1←old L2), L2 is updated to the length of the encryption block #1 in GEM#2, and $\Sigma$=L1+L2+$\alpha$. Here, $\alpha$ is the length of the header of GEM#2 and equal to gemh.

The transmission GEM determiner 38 determines to transmit GEM#3 with or without padding before transmitting GEM#3. Because $\Sigma$ has already been calculated, the transmission GEM determiner 38 obtains Ts=$\Sigma$+gemh. Here, Ts<P, so the transmission GEM determiner 38 calculates the number of pieces of idle GEM. Here, given n pieces, the transmission GEM determiner 38 transmits n pieces of idle GEM to the cipher encoder 991. GEM#3 remains buffered until padding with idle GEM is completed. Only after padding with n pieces of idle GEM is completed, the transmission GEM determiner 38 transmits GEM#3. The transmission GEM determiner 38 then updates the parameters. This update is referred to as update A. Specifically, L1 is updated to the length of the encryption block #1 in GEM#2 (new L1←old L2) L2 is updated to the length of the encryption block #1 in GEM#3, and $\Sigma$=L1+L2+$\alpha$+n×gemh. Here, n×gemh is the idle GEM length.

During padding with idle GEM, further subsequent GEM#4, GEM#5 arrive. Determination for these GEMs may be performed at the timing of arrival. Alternately, each GEM's information about encryption flag and encryption blocks formed in the GEM may be temporarily stored and determination may be done at a suitable timing (timing to start the transmission of the preceding GEM#3). The former is adopted in a flowchart of FIG. 34, wherein, after waiting until the preceding GEM#3 has been received, it is determined whether a new GEM has been received.

For GEM data sequence after the determination to transmit the GEM with or without padding, a transmission schedule until GEM#3 is fixed. For GEM#4 denoted by a dotted line, it not yet determined whether this data sequence is transmitted as it is.

When transmission of idle GEM has been fixed, the transmission status of the preceding GEM#2 is waiting to be transmitted, being transmitted, or has just been transmitted, which is determined depending on the transmission status of the further preceding GEM#1. If GEM#1 is waiting to be transmitted or being transmitted, GEM#2 is waiting to be transmitted. If GEM#1 has already been transmitted, GEM#2 is being transmitted or has just been transmitted.

After padding with idle GEM, idle GEM is transmitted after the completion of transmission of GEM#2. Even when GEM#2 and idle GEM are waiting, determining to transmit the next GEM#3 with or without padding is done. Thus, transmission schedule information (transmission sequence of GEMs and the number of pieces of idle GEM for padding between the GEMs) must be maintained for the number of GEMs that may wait for transmission.

In FIG. 29, it is assumed that Q=2 (two planes of cryptographic calculators), all GEMs #1, #2, #3 in the received GEM data sequence are to be encrypted, and no GEM has been received during an interval between GEM#2 and GEM#3. The operations until the first parameter update B1 are the same as described in FIG. 28 and, therefore, their explanation is not repeated.

After receiving GEM#2, during the interval of no arrival of the next GEM, the transmission GEM determiner 38 determines to insert idle GEM due to no reception of GEM. The transmission GEM determiner 38 then updates the parameters. This update is referred to as parameter update C. Specifically, L1 remains at the length of the encryption block #2 in GEM#1 (new L1←old L2), L2 is updated to the length of the encryption block #1 in GEM#2+gemh (new L2←old L2+gemh), and Σ=L1+L2+α+gemh (new Σ←old Σ+gemh).

After idle GEM insertion, during the interval of no arrival, the transmission GEM determiner 38 determines to insert idle GEM due to no reception of GEM and repeats the above operation.

Then, when GEM#3 is received, the transmission GEM determiner 38 calculates Ts. Here, Ts≥P, so the transmission GEM determiner 38 transmits GEM#3 as is to the cipher encoder 991. The transmission GEM determiner 38 then performs parameter update B1.

In parameter update C, update is performed by adding the length (gemh) of idle GEM to be inserted to old L2 and old Σ, however, update may be calculated in the same way as done in parameter update A. In this case, L1 and L2 are not updated and, when the k-th piece of idle GEM has been determined to be inserted, Σ is calculated by substituting k for n in parameter update A.

In FIG. 30, it is assumed that Q=2 (two planes of cryptographic calculators) and GEMs #1, #2, #4 in the received GEM data sequence are all to be encrypted, but GEM#3 is to be non-encrypted. The operations until the first parameter update B1 are the same as described in FIG. 28 and, therefore, their explanation is not repeated.

Upon having received GEM#3, the transmission GEM determiner 38 detects that it is non-encrypted and transmits it as is to the cipher encoder 991. The transmission GEM determiner 38 then performs parameter update B2. In parameter update B2, update is performed by adding th length (Lgem) of GEM#3 to old L2 and old Σ.

Upon having received GEM#4, the transmission GEM determiner 38 calculates Ts. Here, Ts≥P, so the transmission GEM determiner 38 transmits GEM#4 as is to the cipher encoder 991. The transmission GEM determiner 38 then performs parameter update B1.

Parameter update B2 may be calculated in the same as parameter update B1. In this case, L1 and L2 are not updated and "L1+L2+α" in which Lgem is included in α is updated as Σ.

In FIG. 31, it is assumed that Q=2 (two planes of cryptographic calculators), 16-bit parallel circuits are used, GEMs #1, #2 in the received GEM data sequence are to be encrypted, and both GEMs #1 and #2 have an odd joint.

The transmission GEM determiner 38 sets the length of the encryption block #1 of GEM#1 to L1, the length of the encryption block #2 to L2, and Σ to L1+L2+α. However, α=0, as a GEM header does not intervene between the encryption blocks. Because the GEM#1 has an odd joint at its tail end, the transmission GEM determiner 38 determines to insert idle GEM without an odd joint at its tail end. The transmission GEM determiner 38 performs parameter update C'. Parameter update C' keeps L1 unchanged, updates L2 to old L2+gemhB, and updates Σ to old Σ+gemhB. Here, gemhB is the length of idle GEM without an odd joint at its tail end.

When determining to transit GEM#2 with or without padding, the transmission GEM determiner 38 calculates Ts. Here, Ts≥P, so the transmission GEM determiner 38 transmits GEM#2 as is to the cipher encoder 991. The transmission GEM determiner 38 then performs parameter update B1. Because the GEM#2 has an odd joint at its tail end, the transmission GEM determiner 38 determines to insert idle GEM without an odd joint at its tail end. The transmission GEM determiner 38 performs parameter update C'.

In parameter update C', update is performed by adding the length (gemhB) of idle GEM to be inserted to old L2 and old Σ, however, update may be calculated in the same way as done in parameter update B1. In this case, L1 and L2 are not updated and "L1+L2+α" in which the GEM length (gemhB) is included in a may be updated as Σ. Parameter update C' of GEM#1 makes a equal to gemhB, as a GEM header does not intervene between the encryption blocks. In parameter update C' of GEM#2, because one GEM header intervenes, α is set to (gemh+gemhB).

In FIG. 32, it is assumed that Q=2 (two planes of cryptographic calculators), 16-bit parallel circuits are used, GEMs #1, #2 in the received GEM data sequence are to be encrypted, and both GEMs #1 and #2 do not have an odd joint.

The transmission GEM determiner 38 sets the length of the encryption block #1 of GEM#1 to L1, the length of the encryption block #2 to L2, and Σ to L1+L2+α. However, α=0, as a GEM header does not intervene between the encryption blocks. Because GEM#1 does not have an odd joint at its tail end, the transmission GEM determiner 38 determines not to insert idle GEM for joints.

When determining to transmit GEM#2 with or without padding, because of Ts<P in this case, the transmission GEM determiner 38 determines to insert n pieces (n=2m) of idle GEM. The transmission GEM determiner 38 performs parameter update A'. Parameter update A' updates L1 to old L2, L2 to the length of the next encryption block (encryption block #1 of GEM#2), and Σ is L1+L2+α+n/2×β. Here, β is the length of idle GEM to be inserted.

GEM#2 is stored in the buffer until transmission of n pieces of idle GEM is completed.

Figure 33:
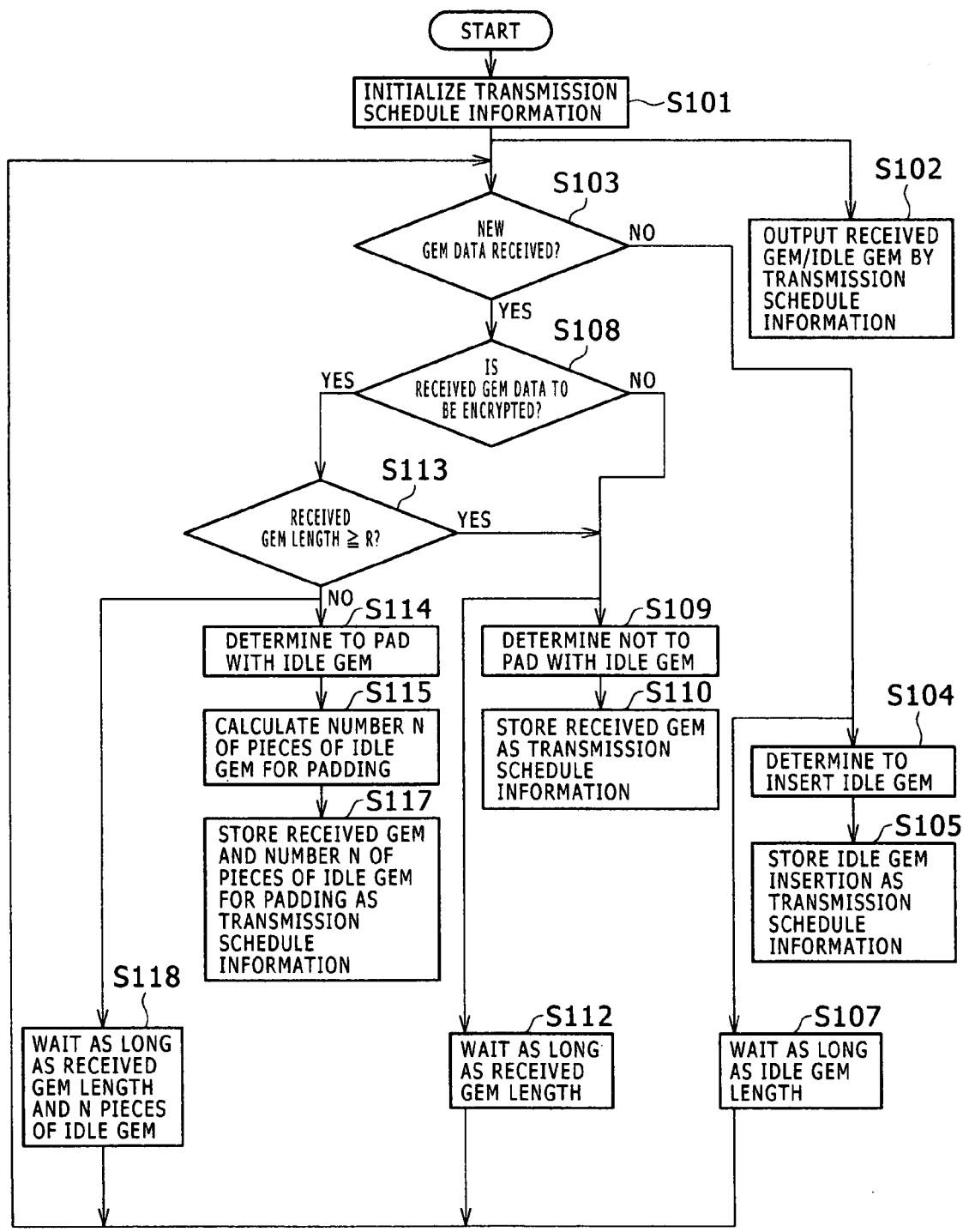
FIG. 33 illustrates determining operations based on GEM length.
Figure 34:
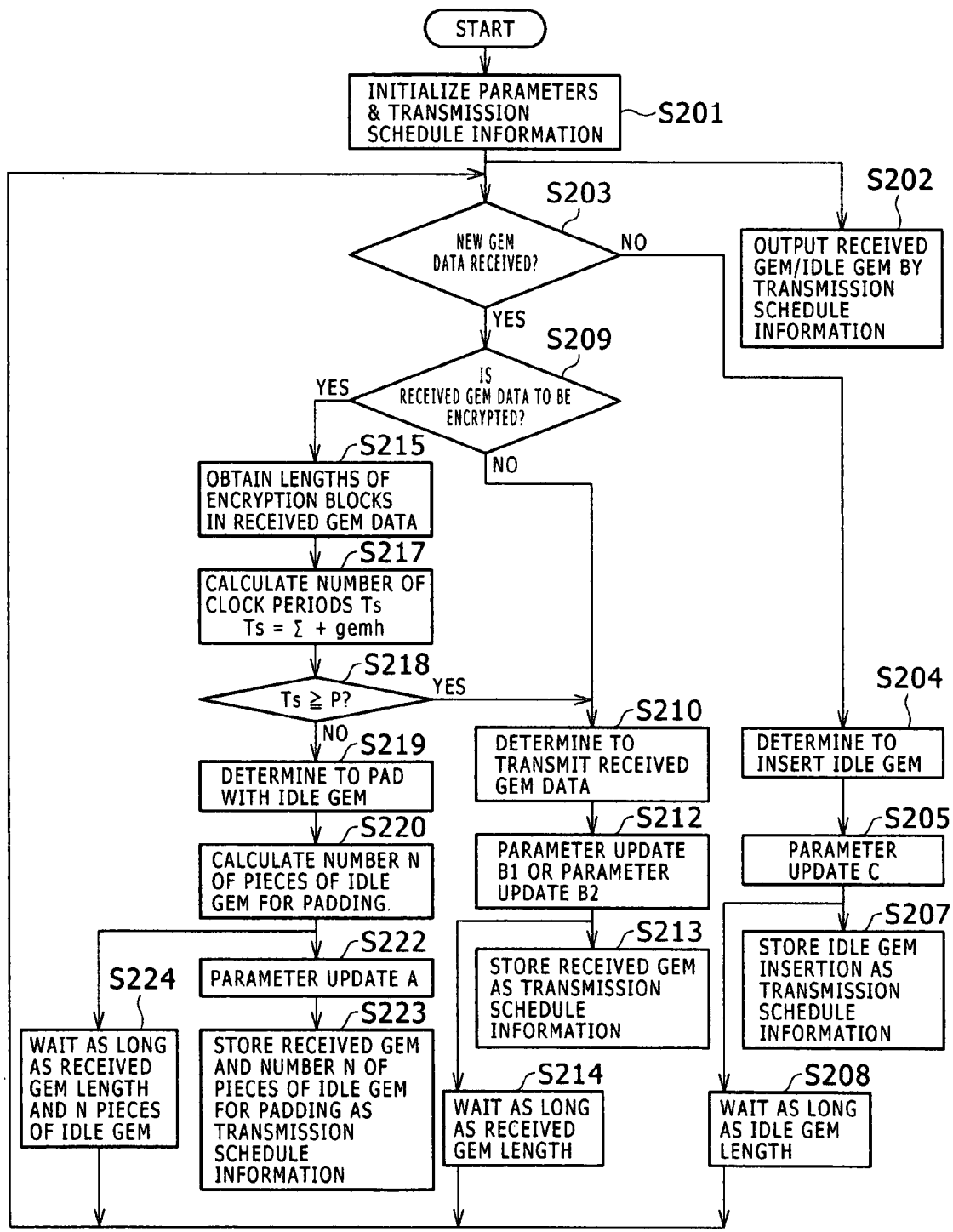
FIG. 34 illustrates determining operations based on previous encryption block information.
Figure 35:
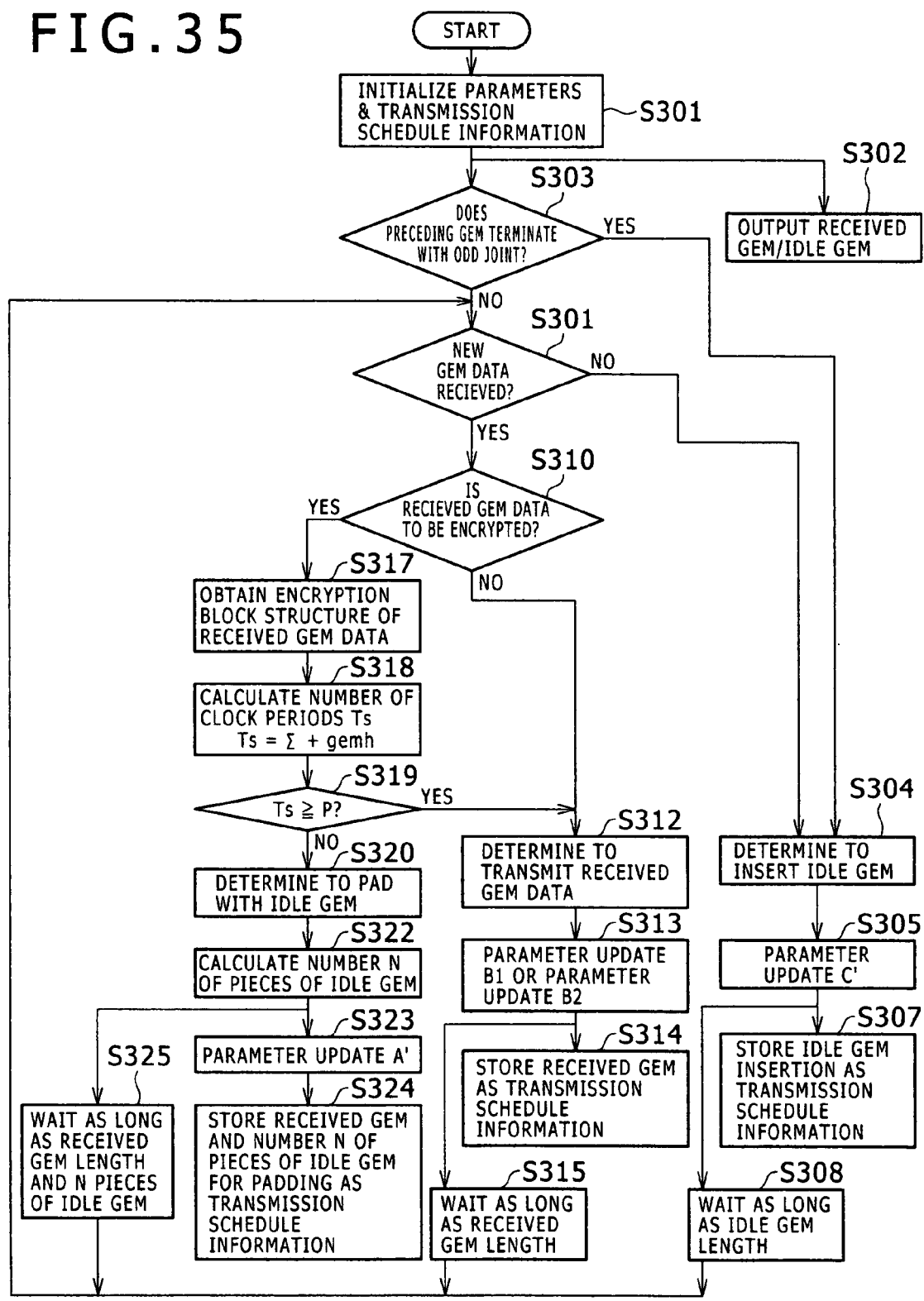
FIG. 35 illustrates determining operations based on previous encryption block information and odd joints.

Referring to FIGS. 33 through 35, the operations of the non-encrypted GEM insertion part 990 are described. Here, FIG. 33 illustrates determining operations based on GEM length. FIG. 34 illustrates determining operations based on previous encryption block information. FIG. 35 illustrates determining operations based on previous encryption block information and odd joints. In FIGS. 33 through 35, steps in serial blocks are processed in series, whereas steps in parallel blocks are processed in parallel.

In FIG. 33, the non-encrypted GEM insertion part 990 first initializes transmission schedule information in the transmission scheduler 37 (S101). The transmission GEM selector 38 in the non-encrypted GEM insertion part 990 transmits received GEM and idle GEM by the transmission schedule information (S102). The transmission GEM selector 38 determines whether new GEM data has been received again (S103). When there is no arrival of new GEM data, the transmission GEM selector 38 determines to insert idle GEM (S104). The transmission scheduler 37 stores the idle GEM insertion as the transmission schedule information (S105). In parallel with steps 104 and 105, the non-encrypted GEM insertion part 990 waits as long as the length of the idle GEM (S107) and returns to step 103. Initialization of the transmission schedule information is performed, inter alia, at the start of PON frame transmission, at the start timing of each PON frame, and upon occurrence of an initialization interrupt.

When new GEM data has been received, as determined at step 103, the transmission GEM selector 38 determines whether the received data is to be encrypted (S108). If the data is non-encrypted, the transmission GEM selector 38 determines not to pad with idle GEM (S109). The transmission scheduler 37 stores the received GEM as the transmission schedule information (S110). In parallel with these steps 109, 110, the non-encrypted GEM insertion part 990 waits as long as the received GEM length (S112) and returns to step 103.

When the data is to be encrypted (YES), as determined at step 108, the transmission GEM selector 38 determines the received GEM length is equal to or more than R (S113). When the determination is YES, operation proceeds to step 109. If the determination at step 113 is NO, the transmission GEM selector 38 determines to pad with idle GEM (S114). The transmission GEM selector 38 calculates the number n of pieces of idle GEM for padding (S115). Further, the transmission scheduler 37 stores the received GEM and the number n of pieces of idle GEM for padding as the transmission schedule information (S117). In parallel with the steps 114 to 117, the non-encrypted GEM insertion part 990 waits as long as the received GEM length and the number n of pieces of idle GEM (S118) and returns to step 103. R is calculated beforehand from time P (the number of clock periods) required for cryptographic calculation in the cipher encoder at the following stage.

If the transmission GEM assembly 100 at the preceding stage is configured to output idle GEM when there is no GEM to output, the non-encrypted GEM insertion part 990 can receive idle GEM. Upon having received idle GEM, the idle GEM is processed as 5-byte GEM which is non-encrypted.

Timing at which GEM is actually transmitted is after the completion of transmission of the preceding GEM (including padded idle GEM). This timing may be rather later than the determined timing, depending on a so-far accumulated amount of padding data. During this interval, the GEM data sequence just to be transmitted is buffered in the next transmission GEM delay memory 31. The non-encrypted GEM insertion part 990 adds information that n pieces of idle GEM padding are to be inserted after GEM numbered n to the transmission scheduler 37 and holds it.

In FIG. 34, the non-encrypted GEM insertion part 990 first initializes the parameters in the transmission GEM encryption block length memory 36 and transmission schedule information in the transmission scheduler 37 (S201). The transmission GEM selector 38 in the non-encrypted GEM insertion part 990 transmits received GEM and idle GEM by the transmission schedule information (S202). The transmission GEM selector 38 determines whether new GEM data has been received again (S203). When there is no arrival of new GEM data, the transmission GEM selector 38 determines to insert idle GEM (S204). The transmission GEM encryption block length memory 36 performs parameter update C (S205). The transmission scheduler 37 stores the idle GEM insertion as the transmission schedule information (S207). In parallel with the step 207, the non-encrypted GEM insertion part 990 waits as long as the length of the idle GEM (S208) and returns to step 203. Initialization of the parameters and transmission schedule information is performed, inter alia, at the start of PON frame transmission, at the start timing of each PON frame, and upon occurrence of an initialization interrupt.

When new GEM data has been received, as determined at step 203, the transmission GEM selector 38 determines whether the received data is to be encrypted (S209). If the data is non-encrypted, the transmission GEM selector 38 determines to transmit the received GEM data (S210). The transmission GEM encryption block length memory 36 performs parameter update B1/B2 (S212). The transmission scheduler 37 stores the received GEM as the transmission schedule information (S213). In parallel with the step 213, the non-encrypted GEM insertion part 990 waits as long as the received GEM length (S214) and returns to step 203. In the step 212, parameter update B2 is performed, because the data is to be encrypted in this case.

When the data is to be encrypted (YES), as determined at step 209, the transmission GEM selector 38 obtains the lengths of the encryption blocks formed in the received GEM data from the encryption block length calculator 33 (S215) and calculates the number of clock periods Ts ($=\Sigma+gemh$) from the start position of the first one of previous Q pieces of encryption blocks up to the first encryption block S of the received GEM data (S217). The transmission GEM selector 38 determines if Ts≥P (S218); if YES, the operation proceeds to step 210. At this time, in the step 212, parameter update B1 is performed.

If NO as determined at step 218, the transmission GEM selector 38 determines to pad with idle GEM (S219). The transmission GEM selector 38 calculates the number n of pieces of idle GEM for padding (S220). The transmission GEM encryption block length memory 36 performs parameter update A (S222). Further, the transmission scheduler 37 stores the received GEM and the number n of pieces of idle GEM for padding as the transmission schedule information (S223). In parallel with the steps 222 and 223, the non-encrypted GEM insertion part 990 waits as long as the received GEM length and the number n of pieces of idle GEM (S224) and returns to step 203. P is time P (the number of clock periods) required for cryptographic calculation in the cipher encoder at the following stage.

Here, the parameter updates are enumerated.

(1) Parameter Update A

Updates L1, L2, . . . , LQ, and $\Sigma$.

The lengths of Q pieces of encryption blocks (current) preceding to and including the last encryption block E of received GEM data are denoted by L1, L2, . . . , LQ (LQ is th length of the last encryption block E) and their total sum is $\Sigma$.

Given that n is the number of pieces of idle GEM for padding, $$\Sigma \leftarrow L1+L2+\ldots+LQ+\alpha+(n \times gemh)$$

(2) Parameter Update B1 for GEM to be Encrypted

Same as parameter update A

However, $\Sigma$ is calculated with n=0, because idle GEM padding is not performed.

(3) Parameter Update B2 for GEM which is Non-Encrypted

Updates LQ and $\Sigma$.

Does not update L1 to LQ−1.

LQ←LQ+Lgem $\Sigma \leftarrow \Sigma + Lgem$ (3) Parameter Update C

Updates LQ and $\Sigma$.

Does not update L1 to LQ−1.

LQ←LQ+gemh $\Sigma + \Sigma + gemh$

In parameter update A or B2, if the number of encryption blocks (current) is less than Q pieces, but is m pieces, the total sum calculated for the m pieces and the lengths of the m blocks are held, provided that m≥1.

In parameter update B2 or C, if the number of encryption blocks is less than Q pieces, but is m pieces, update is performed for the m pieces, provided that m≥0.

The parameters L1, L2, L3, . . . , LQ, and $\Sigma$ are retained in the transmission GEM encryption block length memory 36. L1, L2, . . . , LQ, $\Sigma$, gemh, Lgem, and R all have values expressed in units of clock periods. These values are equivalent to units of bytes in the case of 8-bit parallel circuits and one half of units of bytes in the case of 16-bit parallel circuits. Here, gemh is the number of clock periods required to receive a 5-byte GEM header; gemh=5 in the case of 8-bit parallel circuits and gemh=2 in the case of 16-bit parallel circuits. P: time required for cryptographic calculation (the number of clock periods), Lgem: length of received GEM data, a: if a sequence of encryption blocks (current) is continued from previous GEMs, the sum of the gemh values of the previous GEMs In FIG. 35, the non-encrypted GEM insertion part 990 first initializes the parameters in the transmission GEM encryption block length memory 36 and transmission schedule information in the transmission scheduler 37 (S301). The transmission GEM selector 38 in the non-encrypted GEM insertion part 990 transmits received GEM and idle GEM by the transmission schedule information (S302). The transmission GEM selector 38 determines whether the preceding GEM terminates with an odd joint (S303). When YES, the transmission GEM selector 38 determines to insert idle GEM (S304). The transmission GEM encryption block length memory 36 performs parameter update C' (S305). The transmission scheduler 37 stores the idle GEM insertion as the transmission schedule information (S307). In parallel with the step 307, the non-encrypted GEM insertion part 990 waits as long as the length of the idle GEM (S308) and proceeds to step 309. Initialization of the parameters and transmission schedule information is performed, inter alia, at the start of PON frame transmission, at the start timing of each PON frame, and upon occurrence of an initialization interrupt.

If NO as determined at step 303, the transmission GEM selector 38 determines whether new GEM data has been received (S309). When there is no arrival of new GEM data, the transmission GEM selector 38 proceeds to step 304. When new GEM data has been received, as determined at step 309, the transmission GEM selector 38 determines whether the received data is to be encrypted (S310). If the data is non-encrypted, the transmission GEM selector 38 determines to transmit the received GEM data (S312). The transmission GEM encryption block length memory 36 performs parameter update B1/B2 (S313). The transmission scheduler 37 stores the received GEM as the transmission schedule information (S314). In parallel with the step 314, the non-encrypted GEM insertion part 990 waits as long as the received GEM length (S315) and returns to step 309. In the step 313, parameter update B2 is performed, because the data is non-encrypted in this case.

When the data is to be encrypted (YES), as determined at step 310, the transmission GEM selector 38 obtains the lengths of the encryption blocks formed in the received GEM data from the encryption block length calculator 33 (S317) and calculates the number of clock periods Ts (=Σ+gemh) from the start position of the first one of previous Q pieces of encryption blocks up to the first encryption block S of the received GEM data (S318). The transmission GEM selector 38 determines if Ts≥P (S319); if YES, the operation proceeds to step 312. At this time, in the step 313, parameter update B1 is performed.

If NO as determined at step 319, the transmission GEM selector 38 determines to pad with idle GEM (S320). The transmission GEM selector 38 calculates the number n of pieces of idle GEM for padding (S322). Here, n is even. The transmission GEM encryption block length memory 36 performs parameter update A' (S323). Further, the transmission scheduler 37 stores the received GEM and the number n of pieces of idle GEM for padding as the transmission schedule information (S324). In parallel with the steps 323 and 324, the non-encrypted GEM insertion part 990 waits as long as the received GEM length and the number n of pieces of idle GEM (S325) and returns to step 309. P is time P (the number of clock periods) required for cryptographic calculation in the cipher encoder at the following stage.

Here, the parameter updates are enumerated.
(1) Parameter Update A'
  Updates L1, L2, . . . , LQ, and Σ.
  The lengths of Q pieces of encryption blocks (current) preceding to and including the last encryption block E of received GEM data and preceding are denoted by L1, L2, . . . , LQ (LQ is th length of the last encryption block E) and their total sum is Σ.
  n is the number of pieces of idle GEM for padding and even.

$$\Sigma \leftarrow L1+L2+\ldots+LQ+\alpha+n/2\times\beta$$

(2) Parameter Update B1 for GEM to be Encrypted
  Same as parameter update A
  However, Σ is calculated with n=0, because idle GEM padding is not performed.
(3) Parameter Update B2 for GEM which is Non-Encrypted
  Updates LQ and Σ.
  Does not update L1 to LQ−1.
  LQ←LQ+Lgem
  Σ←Σ+Lgem
(4) Parameter Update C'
  Updates LQ and Σ.
  Does not update L1 to LQ−1.
  LQ←LQ+gemhB
  Σ←Σ+gemhB In parameter update A' or B1, if the number of encryption blocks (current) is less than Q pieces, but is m pieces, the total sum calculated for the m pieces and the lengths of the m blocks are held, provided that m≥1.

In parameter update B2 or C', if the number of encryption blocks is less than Q pieces, but is m pieces, update is performed for the m pieces, provided that m≥0.

The parameters L1, L2, L3, . . . , LQ, and Σ are retained in the transmission GEM encryption block length memory 36. Here, L1, L2, . . . , LQ, Σ, gemh, Lgem, and R all have values expressed in units of clock periods, wherein the values are equivalent to units of bytes in the case of 8-bit parallel circuits and one half of units of bytes in the case of 16-bit parallel circuits. Here, gemh is the number of clock periods required to receive a 5-byte GEM header; gemh=5 in the case of 8-bit parallel circuits and gemh=2 in the case of 16-bit parallel circuits.

$$\beta = 2 \times gemh + 1 (= gemh + gemhB)$$

$$gemhB = gemh + 1$$

P: time required for cryptographic calculation (the number of clock periods)
Lgem: length of received GEM data
α: if a sequence of encryption blocks (current) is continued from previous GEMs, the sum of the gemh values of the previous GEMs According to the present embodiment, an encryption apparatus incorporating an encryption circuit with reduced size is producible.

What is claimed is:
1. An encryption apparatus comprising:
  an idle data inserting unit that takes an input of a frame including a fixed-length header and a variable-length payload; and an encrypting unit that receives an output of the idle data inserting unit, wherein, if a first length of the frame is less than a predetermined value which corresponds to a predetermined time period for encrypting the variable-length payload by the encrypting unit, the idle data inserting unit appends at least one fixed-length idle data following the variable-length payload to make a second length of the frame greater than or equal to the predetermined value and transmits the frame including the at least one fixed-length idle data to the encrypting unit.

2. The encryption apparatus according to claim 1, wherein the idle data inserting unit, upon detecting stop of receiving the frame, transmits the at least one fixed-length idle data to the encrypting unit.

3. The encryption apparatus according to claim 1, wherein, if the frame is to be non-encrypted, the idle data inserting unit transmits the frame as it is to the encrypting unit.

4. The encryption apparatus according to claim 1, wherein:
the frame is configured to position one header byte of a processing sequence in an upper byte position and another one byte following the one header byte in a lower byte position, and is a 16-bit sequence parallel for each two bytes; and
if the frame has an odd joint in which a final byte of the frame is located in the upper byte position, the idle data inserting unit appends the at least one fixed-length idle data to make a predetermined pattern and transmits the frame padded with the at least one fixed-length idle data to the encrypting unit.

5. The encryption apparatus according to claim 1, wherein:
the variable-length payload includes first and second blocks to be processed, which are independently encrypted,
the predetermined time period is a time period for encrypting one of the blocks by the encrypting unit,
the encrypting unit includes first and second cryptographic calculation planes, the first cryptographic calculation plane encrypts the first block, and
the second cryptographic calculation plane encrypts the second block.

6. The encryption apparatus according to claim 1, wherein the at least one fixed-length idle data includes a fixed pattern of five bytes.

7. The encryption apparatus according to claim 1, wherein:
the frame consists of an at minimum six-byte-length of data including a header having a five-byte-length and a payload having a one-byte-length,
the encrypting unit includes two cryptographic calculation planes which independently encrypt N bytes in one clock,
if the predetermined time period is less than or equal to $6\times2\div N$ clocks, the predetermined value is obtained by time periods of greater than a first value which is equal to the predetermined time period divided by 2, and
if the predetermined time period is greater than or equal to $6\times2\div N$ clocks, the predetermined value is obtained by time periods of greater than a second value which is equal to the predetermined time period subtracted by 6.

8. The encryption apparatus according to claim 1, wherein:
the frame consists of an at minimum six-byte-length of data including a header having a five-byte-length and a payload having a one-byte-length,
the encrypting unit includes three cryptographic calculation planes which independently encrypt N bytes in one clock,
if the predetermined time period is less than or equal to $6\times3\div N$ clocks, the predetermined value is obtained by time periods of greater than a first value which is equal to the predetermined time period divided by 3, and
if the predetermined time period is greater than or equal to $6\times3\div N$ clocks, the predetermined value is obtained by time periods of greater than a second value which is equal to the predetermined time period subtracted by 6 and then divided by 2.

\* \* \* \* \*